(12) United States Patent
Bozic et al.

(10) Patent No.: US 10,801,615 B2
(45) Date of Patent: Oct. 13, 2020

(54) PRESSURE LIMITING DEVICE, IN PARTICULAR FOR A HYDRAULIC ASSIST SYSTEM FOR VEHICLES

(71) Applicant: POCLAIN HYDRAULICS INDUSTRIE, Verberie (FR)

(72) Inventors: Ante Bozic, Verberie (FR); Luka Peternel, Verberie (FR); Anze Celik, Verberie (FR)

(73) Assignee: POCLAIN HYDRAULICS INDUSTRIE, Verberie (FR)

( * ) Notice: Subject to any disclaimer, the term of this patent is extended or adjusted under 35 U.S.C. 154(b) by 0 days.

(21) Appl. No.: 15/580,617

(22) PCT Filed: Jun. 10, 2016

(86) PCT No.: PCT/EP2016/063379
§ 371 (c)(1),
(2) Date: Dec. 7, 2017

(87) PCT Pub. No.: WO2016/198655
PCT Pub. Date: Dec. 15, 2016

(65) Prior Publication Data
US 2018/0299009 A1  Oct. 18, 2018

(30) Foreign Application Priority Data

Jun. 10, 2015 (FR) .................................. 15 55295
Nov. 12, 2015 (EP) ............................... 015/076491
Nov. 12, 2015 (FR) .................................. 15 60843

(51) Int. Cl.
*F16H 61/4017* (2010.01)
*F16H 61/4078* (2010.01)
*F15B 13/02* (2006.01)

(52) U.S. Cl.
CPC ....... *F16H 61/4017* (2013.01); *F15B 13/024* (2013.01); *F16H 61/4078* (2013.01); *F15B 2211/50527* (2013.01)

(58) Field of Classification Search
CPC ............ F16H 61/4017; F16H 61/4078; F15B 13/024; F15B 2211/50527; F16K 17/04
See application file for complete search history.

(56) References Cited

U.S. PATENT DOCUMENTS 2,961,829 A     11/1960  Weisenbach
3,748,859 A  *   7/1973  Pruvot ................... F16H 39/00
                                                         60/464

(Continued)

FOREIGN PATENT DOCUMENTS

DE   102009011247 A1   9/2010
EP       0059485 A1    9/1982
FR       2996176 A1    4/2014

OTHER PUBLICATIONS

Poclain Hydraulics Industrie, "International Search Report and Written Opinion," PCT Application No. PCT/EP2015/076491 (dated Feb. 22, 2016) (with English translation cover sheet).

(Continued)

*Primary Examiner* — Marina A Tietjen
(74) *Attorney, Agent, or Firm* — Womble Bond Dickinson (US) LLP

(57) ABSTRACT

The invention relates to a pressure-limiting device designed to be installed in a system comprising a first line (11) and a second line (12) that can comprise pressurised oil, as well as comprising a discharge and/or booster line (10). The limiting device is characterised in that it comprises means (131, 132, 133, 134) forming two valves, each associated with one of the two lines and adapted to open in the event of an overpressure above a pre-determined threshold on the associated line, so as to discharge the corresponding overpres- (Continued)

sure towards the discharge and/or booster line, said two valves comprising a common support stem (126) that operates in traction under the action of at least one spring defining a pressure corresponding to the pre-determined threshold. The invention also relates to a hydraulic assist system and to a vehicle comprising such a device.

33 Claims, 20 Drawing Sheets

(56) References Cited

U.S. PATENT DOCUMENTS

| | | | |
|---|---|---|---|
| 4,244,184 A | 1/1981 | Baldauf et al. | |
| 4,696,162 A | 9/1987 | Williams | |
| 7,513,111 B2* | 4/2009 | Daigre | F16H 61/4017 |
| | | | 137/493 |
| 2005/0097887 A1 | 5/2005 | Landhuis | |
| 2005/0247189 A1 | 11/2005 | Hazzard et al. | |
| 2011/0240897 A1 | 10/2011 | Gepraegs et al. | |
| 2014/0251464 A1 | 9/2014 | Apadula et al. | |
| 2015/0251533 A1 | 9/2015 | Heren et al. | |

OTHER PUBLICATIONS

Poclain Hydraulics Industrie, "French Preliminary Search Report and Written Opinion," FR Application No. 1500495 (dated Feb. 12, 2016) (with English translation cover sheet).

International Preliminary Report on Patentability received for PCT Patent Application No. PCT/EP2015/076491, dated Sep. 28, 2017, 13 pages (7 pages of English Translation and 6 pages of Original Document).

Preliminary Research Report received for French Application No. 1560843, dated Jul. 1, 2016, 2 pages (1 page of French Translation Cover Sheet and 1 page of original document).

Preliminary Research Report received for French Application No. 1555295, dated May 2, 2016, 2 pages (1 page of French Translation Cover Sheet and 1 pages of original document).

International Search Report and Written Opinion received for PCT Patent Application No. PCT/EP2016/063379, dated Aug. 31, 2016, 19 pages (9 pages of English Translation and 10 pages of Original Document).

International Preliminary Report on Patentability received for PCT Patent Application No. PCT/EP2016/063379, dated Dec. 21, 2017, 14 pages (8 pages of English Translation and 6 pages of Original Document).

* cited by examiner

State of the art

State of the art

State of the art

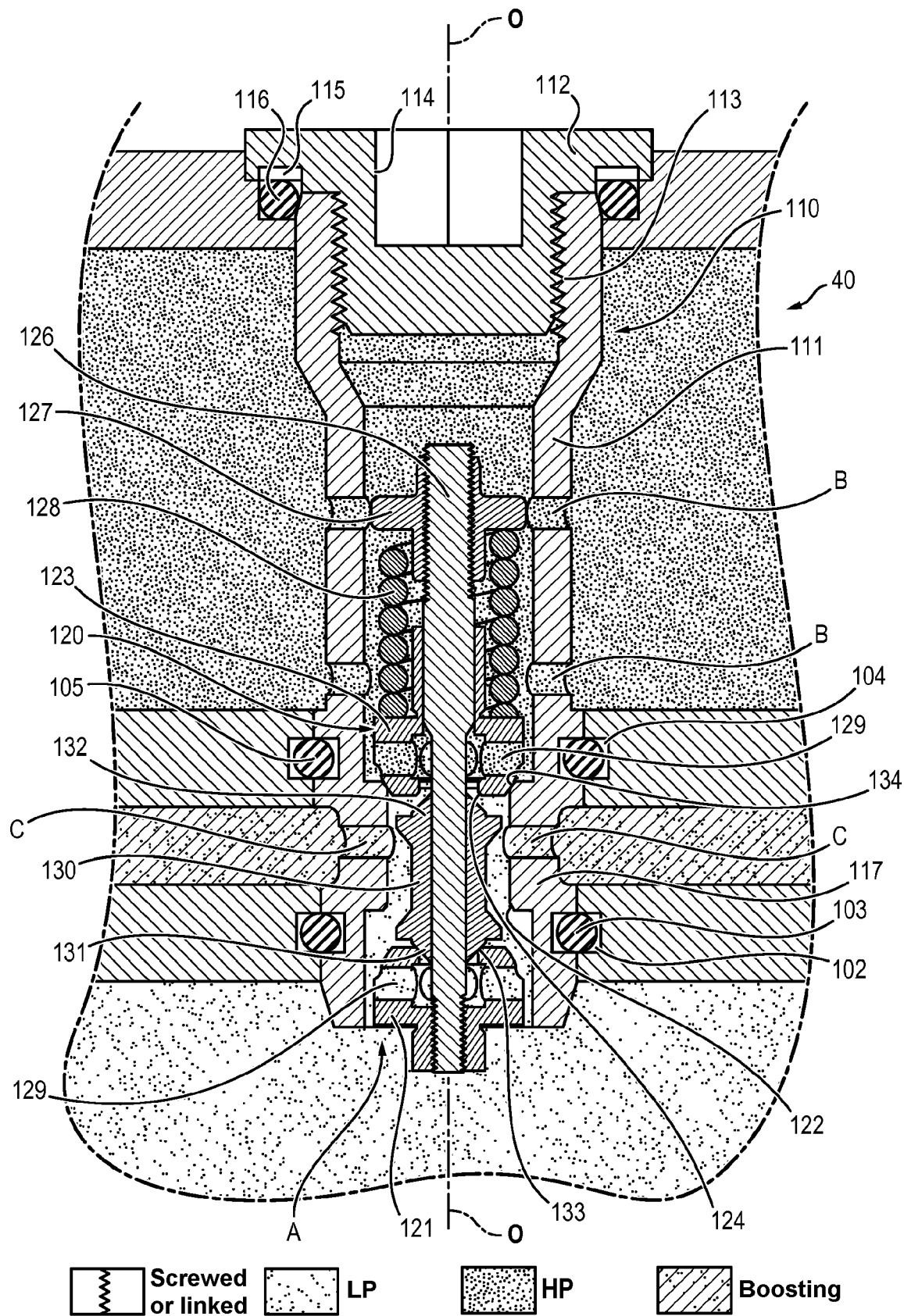

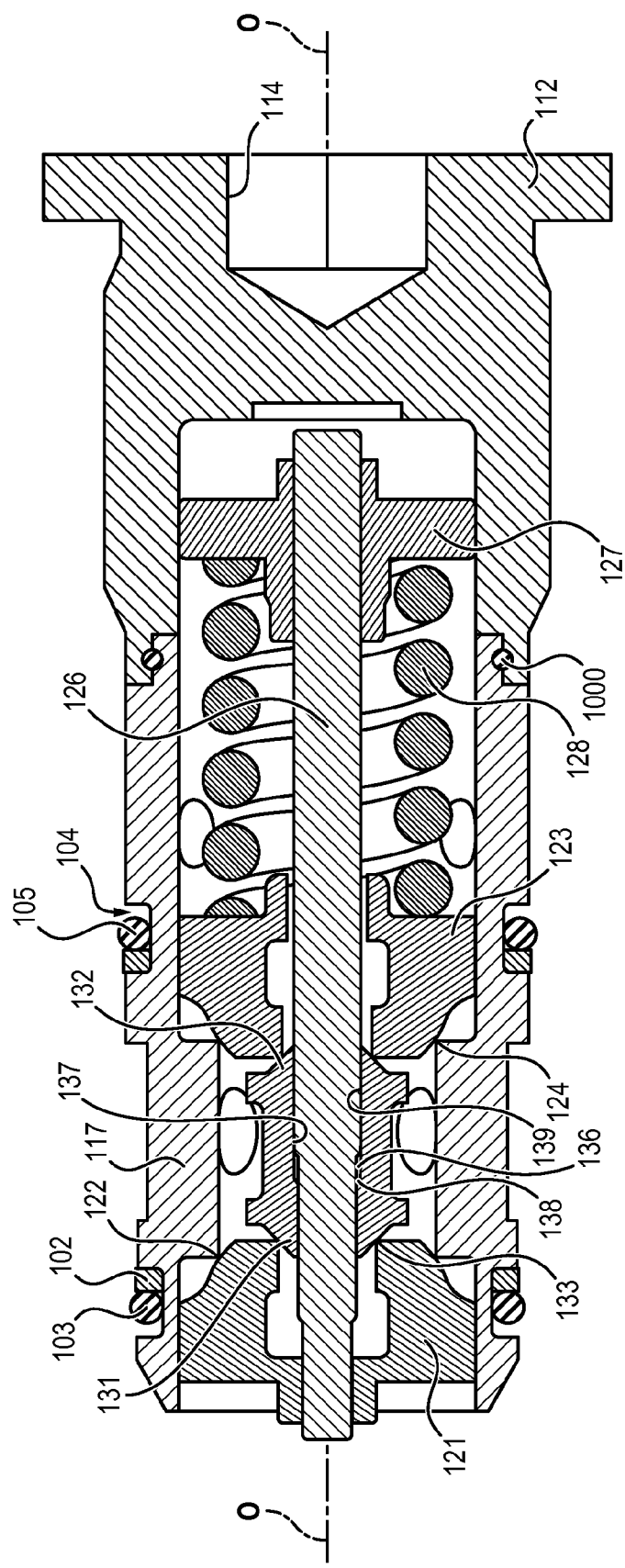

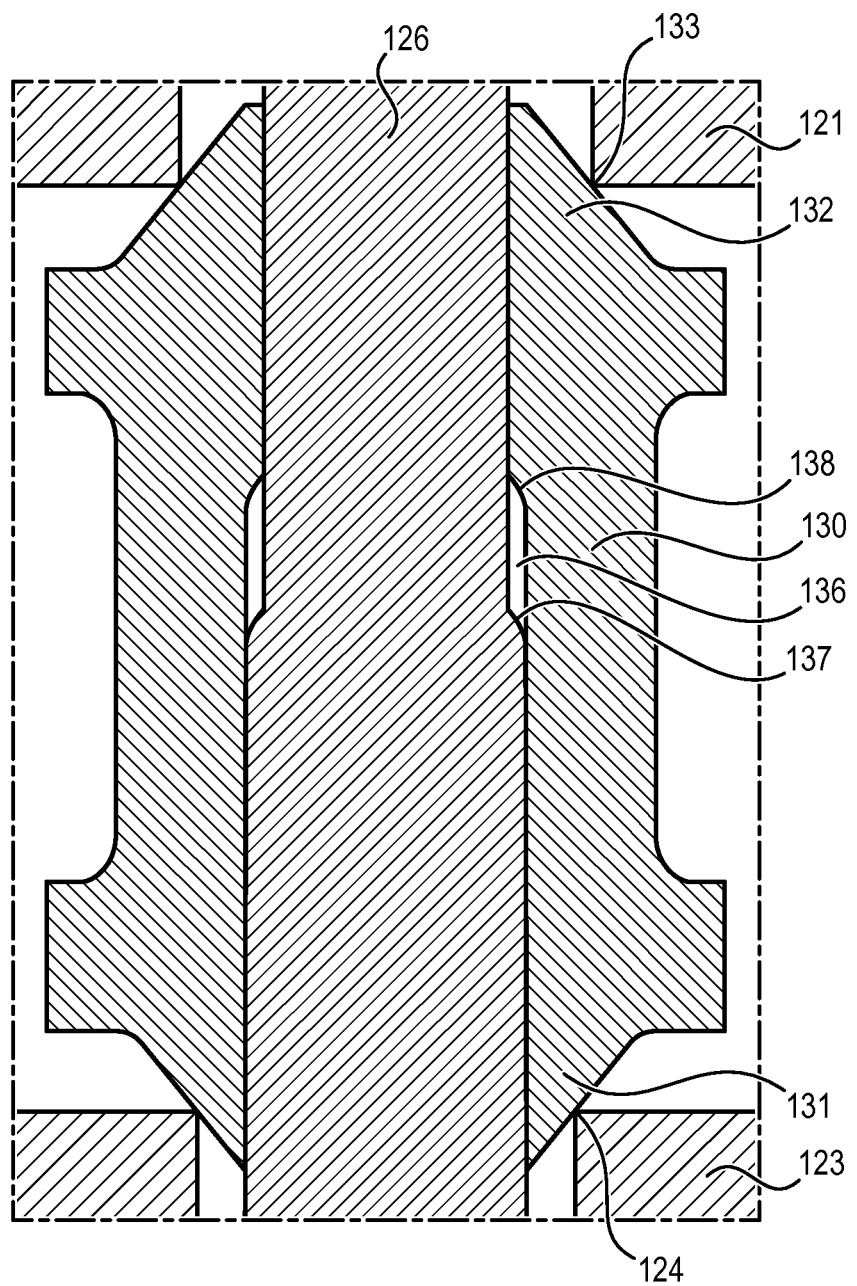
FIG. 10 bis

FIG. 13
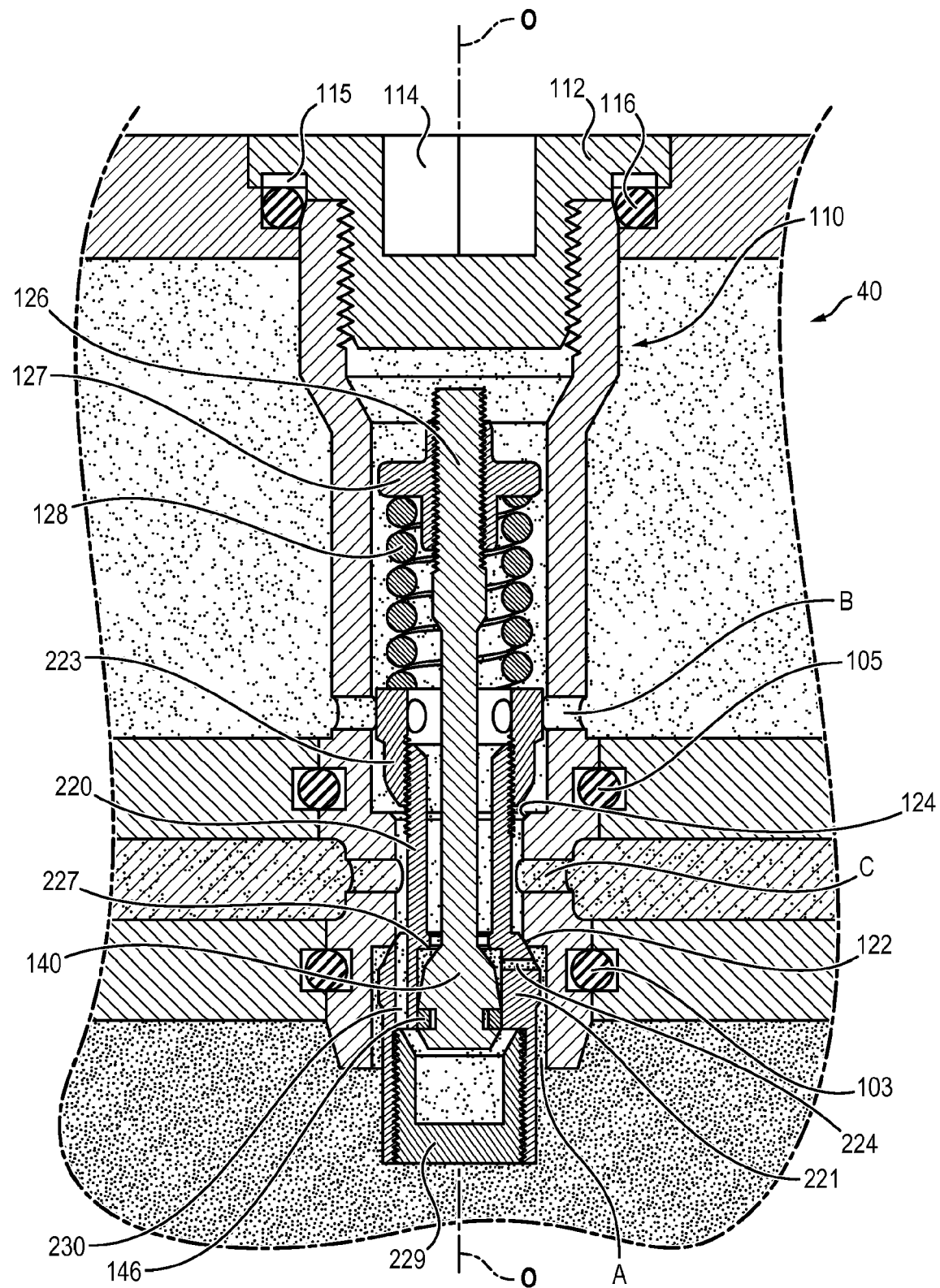

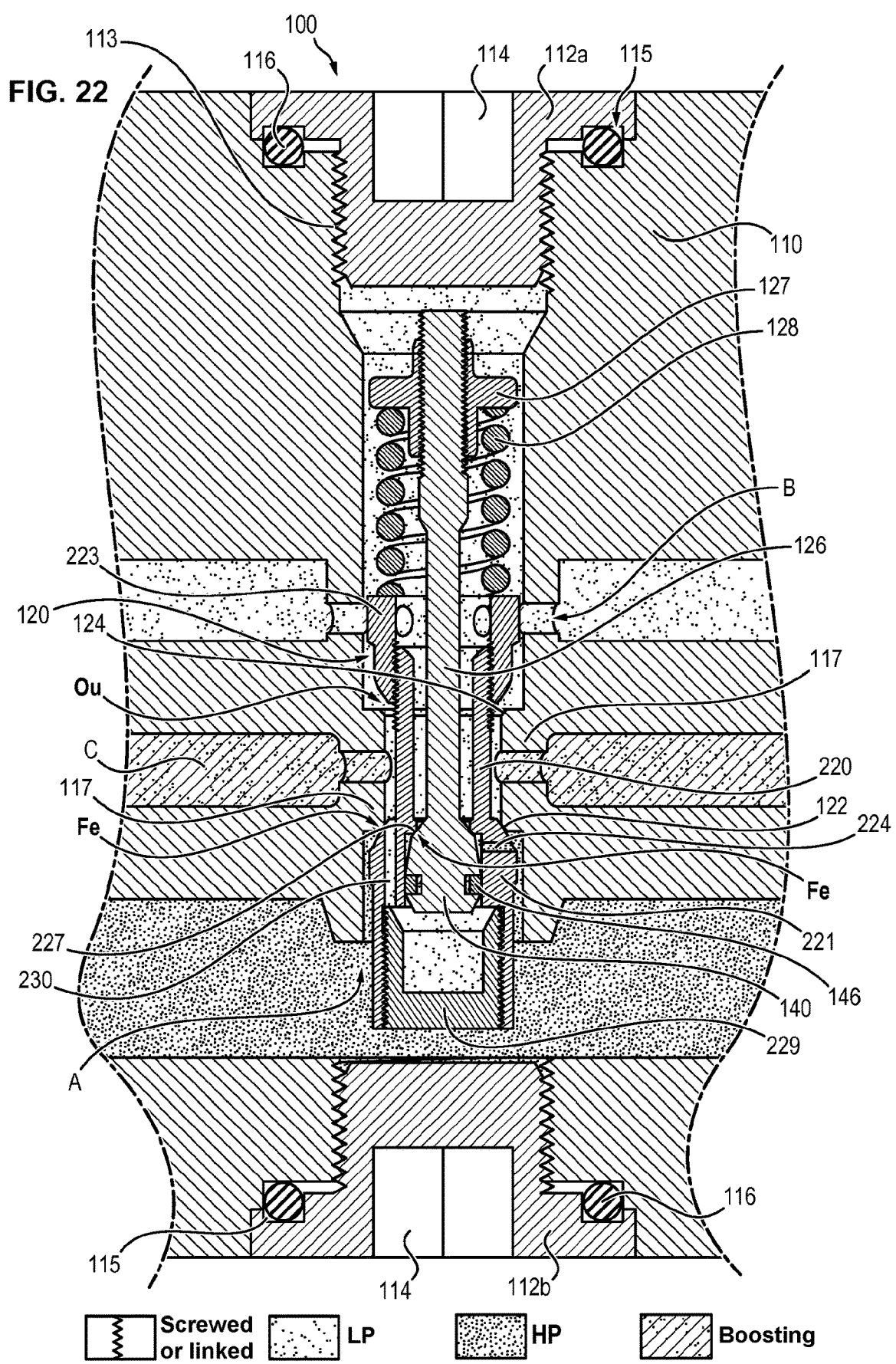

PRESSURE LIMITING DEVICE, IN PARTICULAR FOR A HYDRAULIC ASSIST SYSTEM FOR VEHICLES

GENERAL TECHNICAL FIELD

The invention relates to managing excess pressures of hydraulic circuits, and more particularly to devices of the "pressure limiter" or "pressure-relief valve" type.

The invention applies in particular to hydraulic assistance circuits for a vehicle.

Hydraulic assistance is generally carried out using hydraulic machines which may supply torque to wheels not motorized by a mechanical transmission, or supporting wheels. These machines transform the hydraulic energy of pressurized oil into mechanical energy, or the reverse.

PRIOR ART

Figure 1:
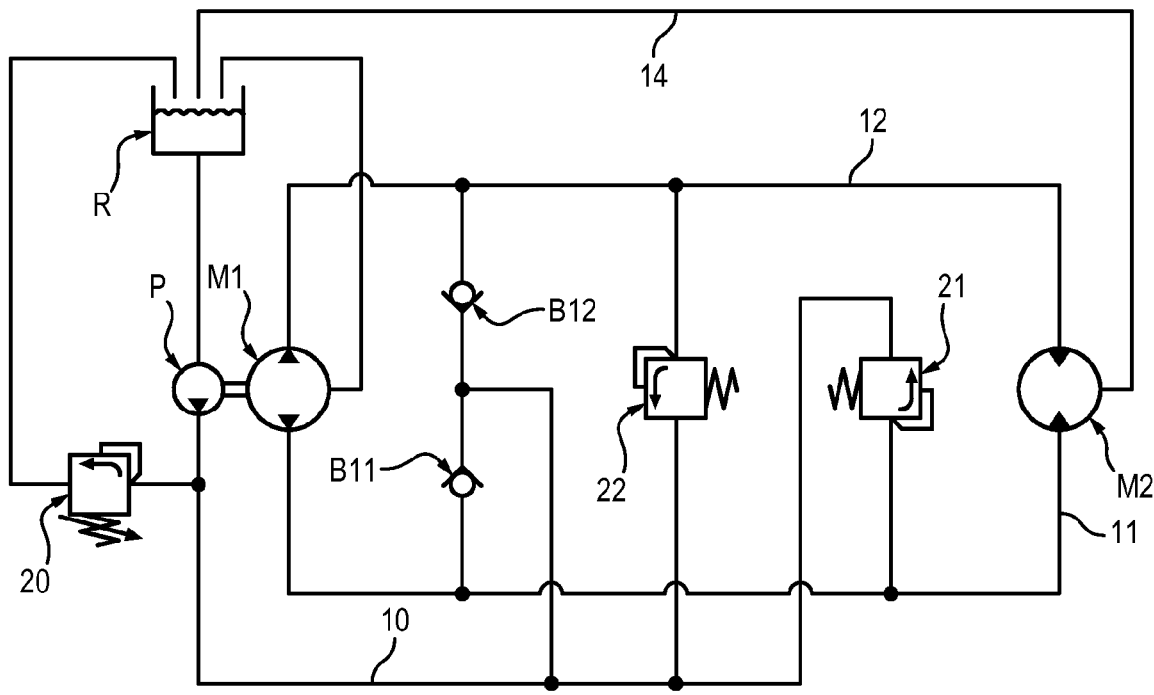

FIG. 1 shows a hydraulic schematic of the prior art. In a vehicle, a first hydraulic machine M1 is mounted on a first axle, for example the front axle and a second hydraulic machine M2 is mounted on a second axle, for example the rear axle. What is meant by machines is that they may function as a motor or as a pump.

The configuration shown corresponds to a "bicycle chain" (document FR2996176), meaning that during the main use, a first of the machines M1 or M2 acts as a pump for a second of the machines M1 or M2 respectively, which acts as a motor.

The vehicle generally comprises a heat engine (not shown in the figures) which drives an axle where the first hydraulic machine M1 is located. To this end, the discharge of the first machine M1 is connected to the intake of the second machine M2 by a line 11 called a high-pressure line and the discharge of the second machine M2 is connected to the intake of the first machine M1 by a line 12 called a low-pressure line.

The terms high and low pressure correspond to use when driving forward with torque addition ("main use").

Consequently, as pressure may be reversed, the terms first line 11 and second line 12 are preferred.

The first and the second line 11, 12 operate in a closed circuit and may be subject to excess pressures which may damage the machines M1, M2 or the seals present in the circuit.

By way of an example, the pressures are on the order of 400 bars in one line and a few tens of bars in the other line, at the very least at a boost pressure.

To protect the hydraulic circuit and in particular the first and second lines 11, 12, it is known to dispose two pressure limiters associated respectively with these lines.

FIG. 1 shows a first variant of the prior art: a pressure limiter 21 is disposed between the first line 11 and a booster line 10, another limiter 22 is disposed between the second line 12 and the booster line 10.

Each limiter 21, 22 may be set to the desired value.

The booster line 10 is a line allowing a booster pump P to feed the first and second lines 11, 12 with oil, from a reservoir R, so as to engage the hydraulic assistance. Due to the fact of a pressure limiter 20 in parallel to the pump P, the booster circuit 10 allows the discharge of excess pressure. Check valves B11, B12 are used for boosting.

This solution uses two protection members (the pressure limiters 21, 22).

Figure 2:
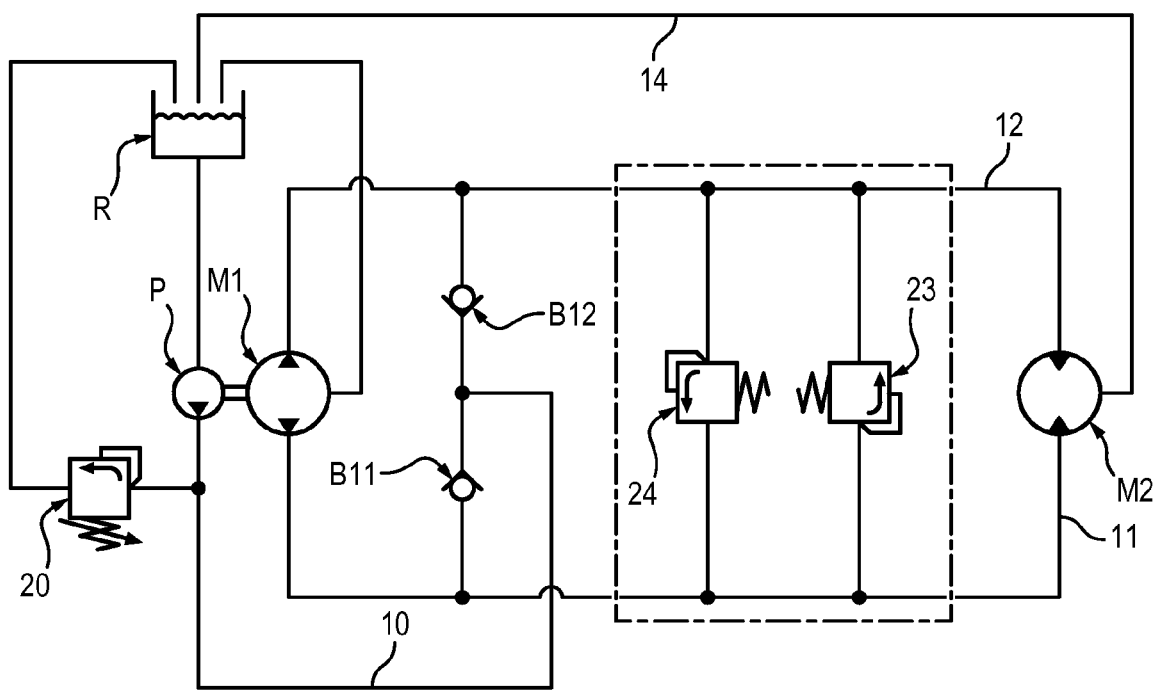

FIG. 2 shows a second variant of the prior art: two pressure limiters 23, 24 are disposed between the first and second lines 11, 12. One line always having lower pressure, it may tolerate the excess pressure present in the other.

This solution also uses two protection members (the pressure limiters 23, 24). Also found again in FIG. 2 are two check valves B11, B12 which are used for boosting.

In FIG. 2, a line connecting the casing of the machine M2 to the reservoir R is designated 14.

Figure 3:
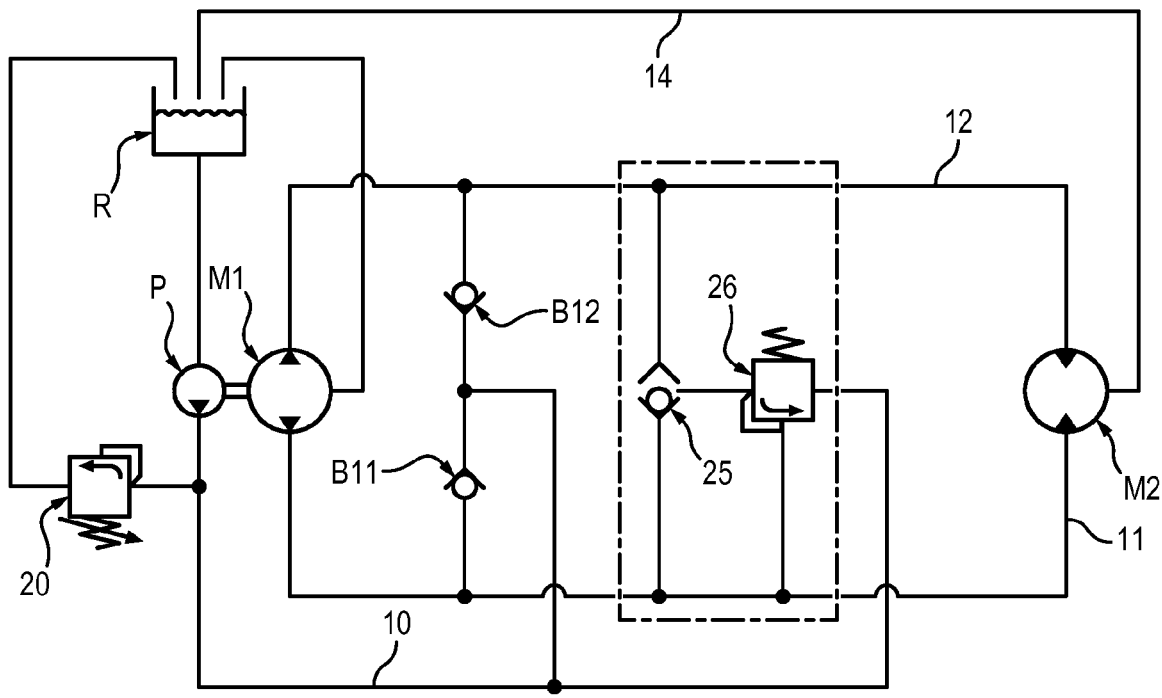

FIG. 3 shows a third variant of the prior art: a high-pressure selector valve 25 selects the line with the higher pressure between the first and the second line 11, 12 and sends it to the booster line 10 via a pressure limiter 26. In this manner, one limiter is eliminated, but a circuit selector valve 25 must be added.

This solution also uses two protection members. Also found again in FIG. 2 are two check valves B11, B12 which are used for boosting.

To optimize the available space and reduce the costs of manufacture, simpler members carrying out the same functions are sought.

PRESENTATION OF THE INVENTION

To this end, the invention proposes a pressure relief device suitable to be installed in a system comprising a first feed line and a second feed line which may comprise pressurized oil and comprising a discharge and/or booster line, characterized in that the relief device comprises means forming two valves associated respectively with one of the two lines and suitable for opening in the event of excess pressure above a predetermined threshold on the associated feed line so as to discharge the corresponding excess pressure toward the discharge and/or booster line or the other feed line, the two valves comprising a common support stem which operates in tension under the biasing of at least one spring defining a setting which corresponds to said predetermined threshold.

According to another advantageous feature of the invention, the pressure relief device integrates means which form two check valves associated respectively with one of the two lines, for boosting.

Henceforth, pressure relief occurs by means of a single device, which improves the compactness of the system as well as its cost of manufacture.

The invention also relates to assistance systems and to vehicles equipped with a pressure relief device conforming to the invention.

PRESENTATION OF THE FIGURES

Figure 4:
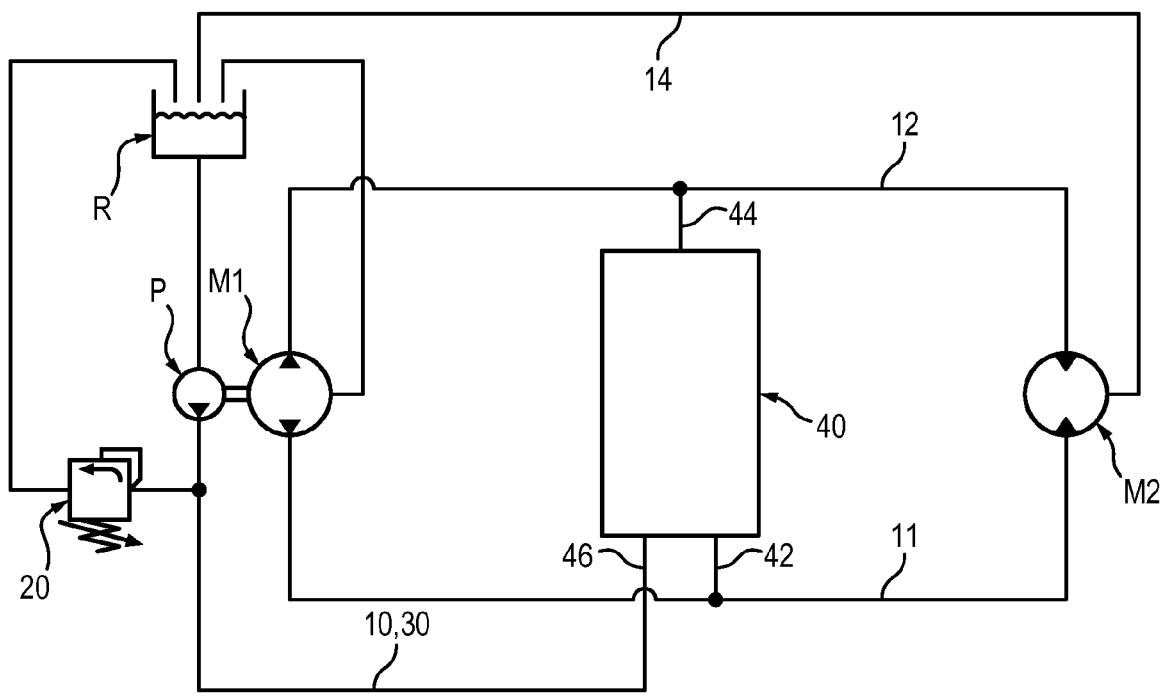
Figure 5:
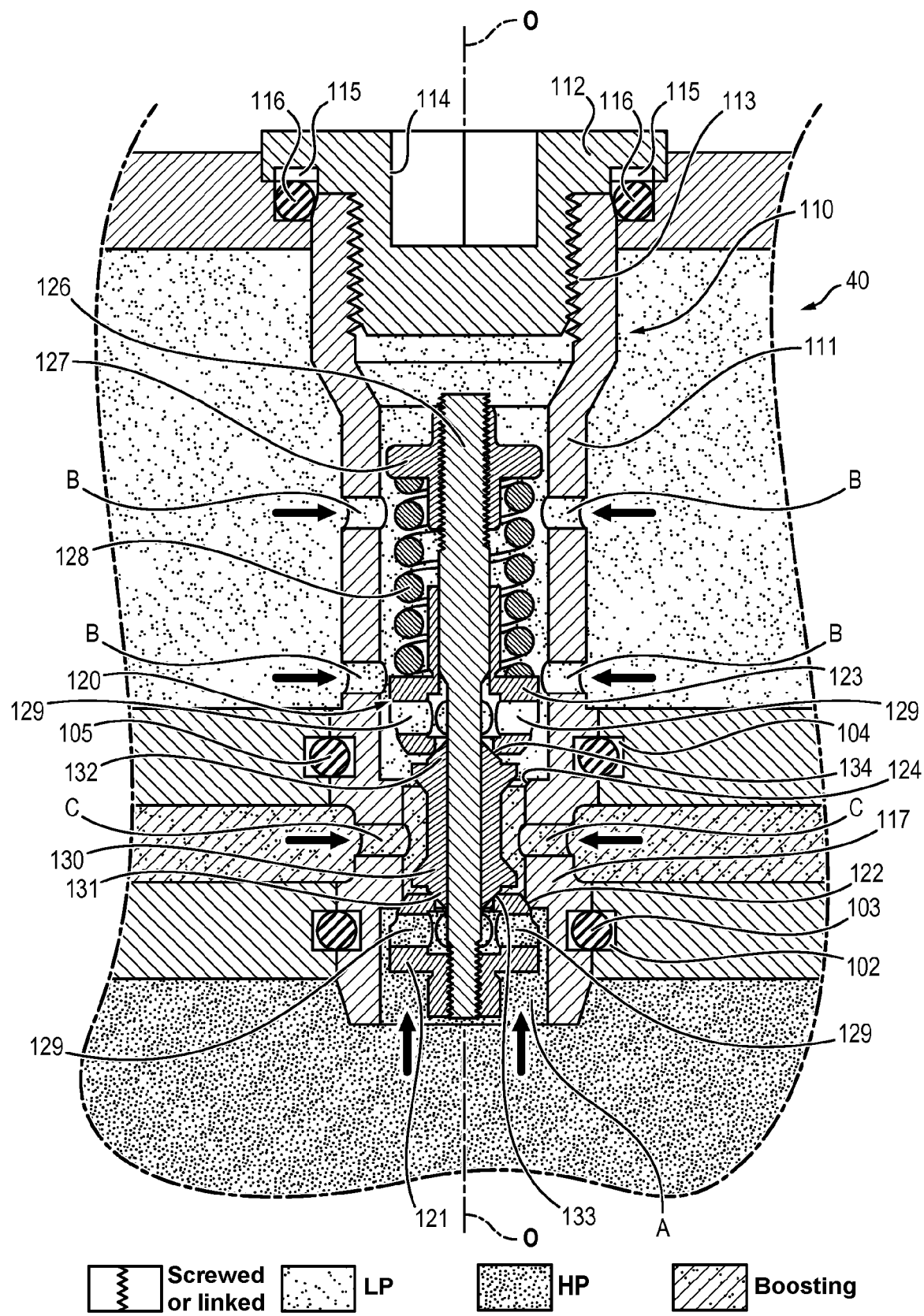
Figure 6:
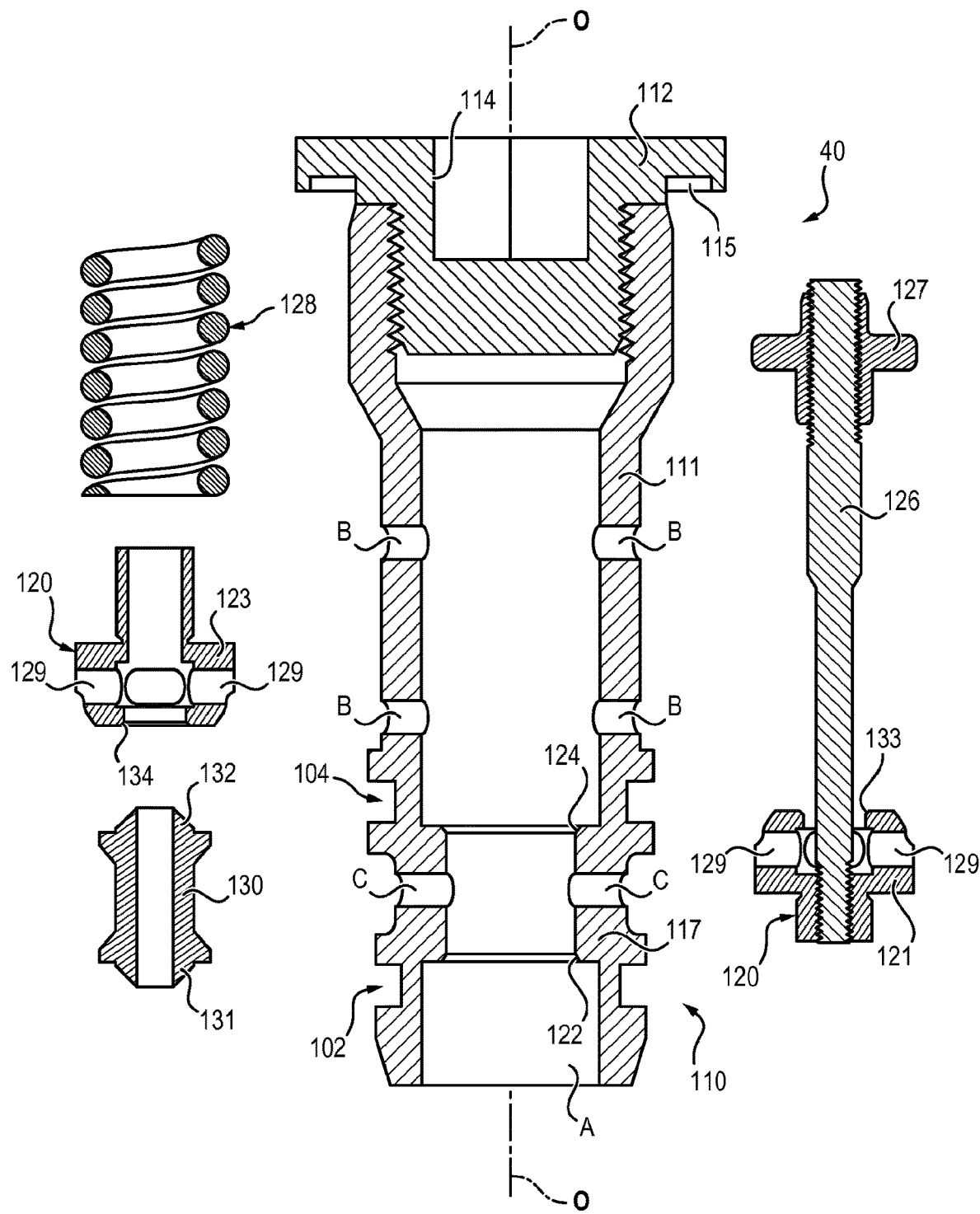
Figure 7:
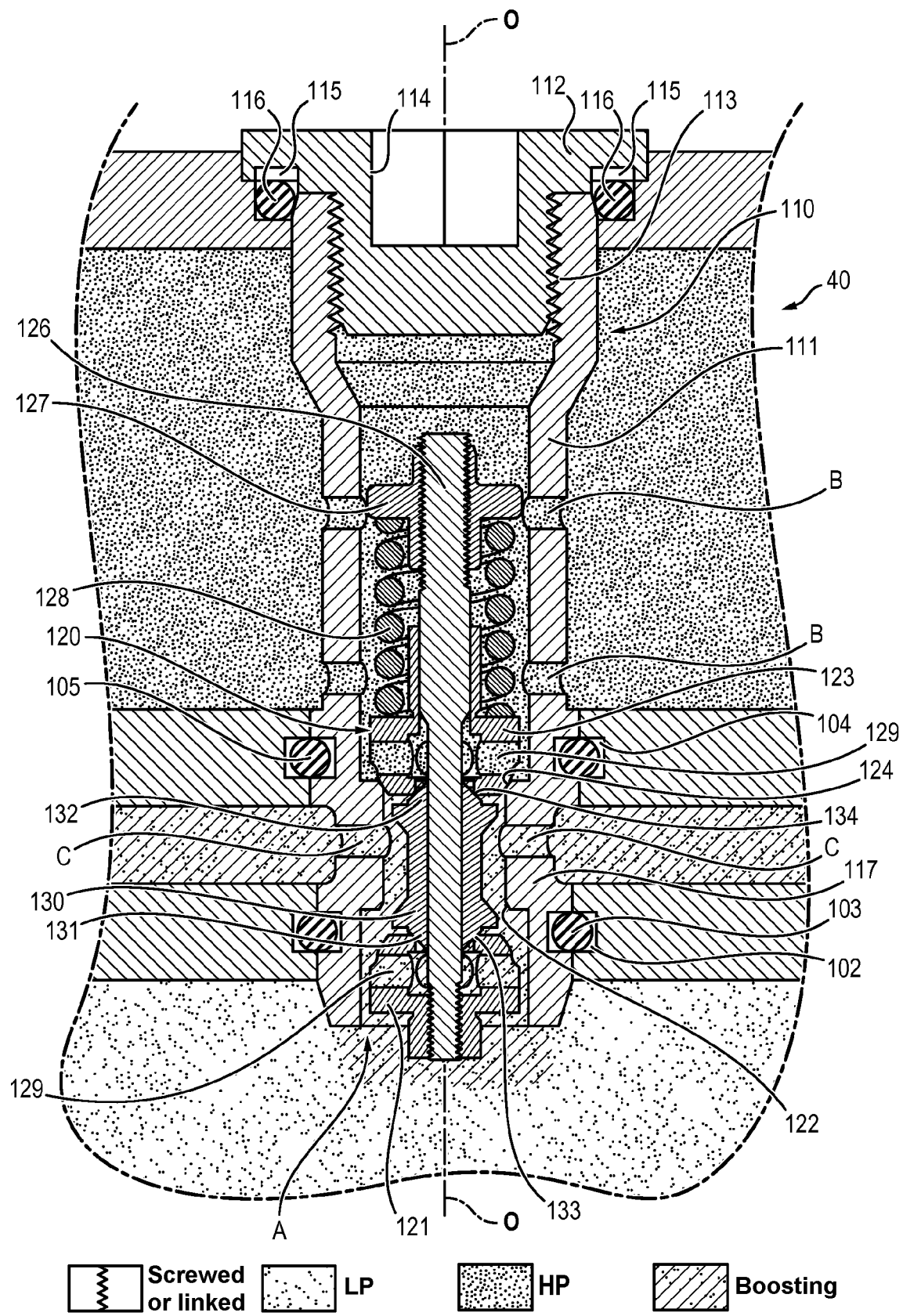
Figure 8:
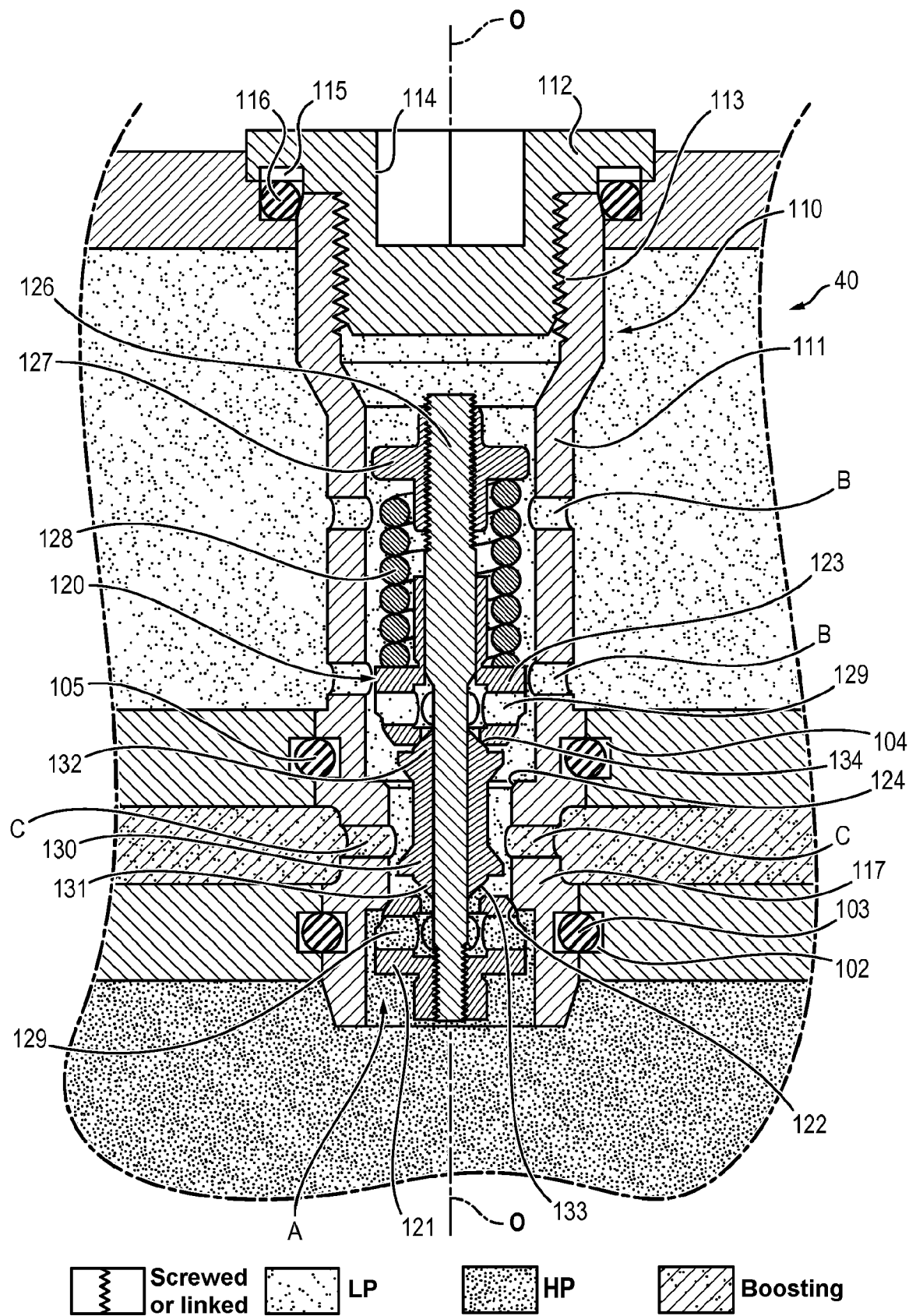
Figure 11:
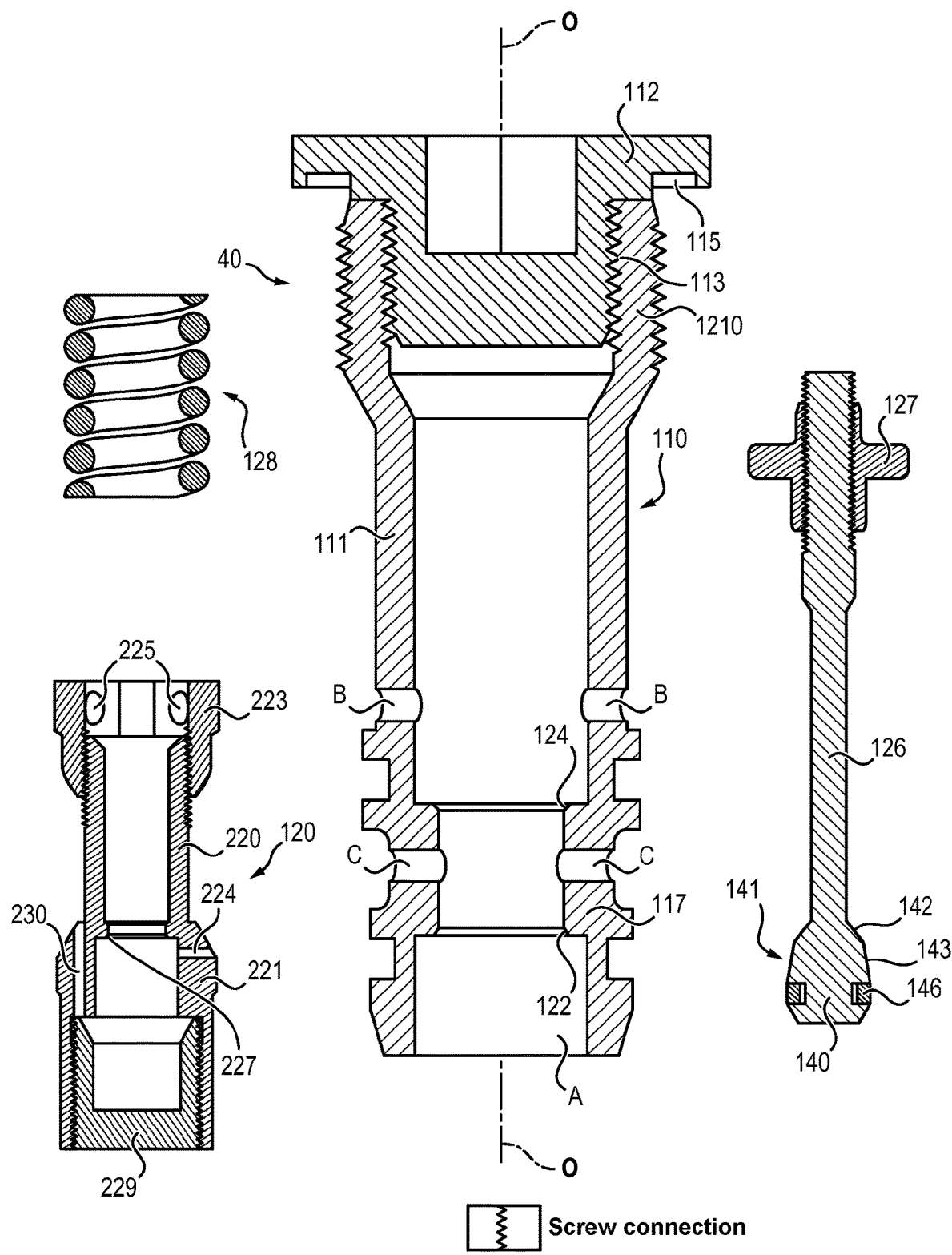
Figure 12:
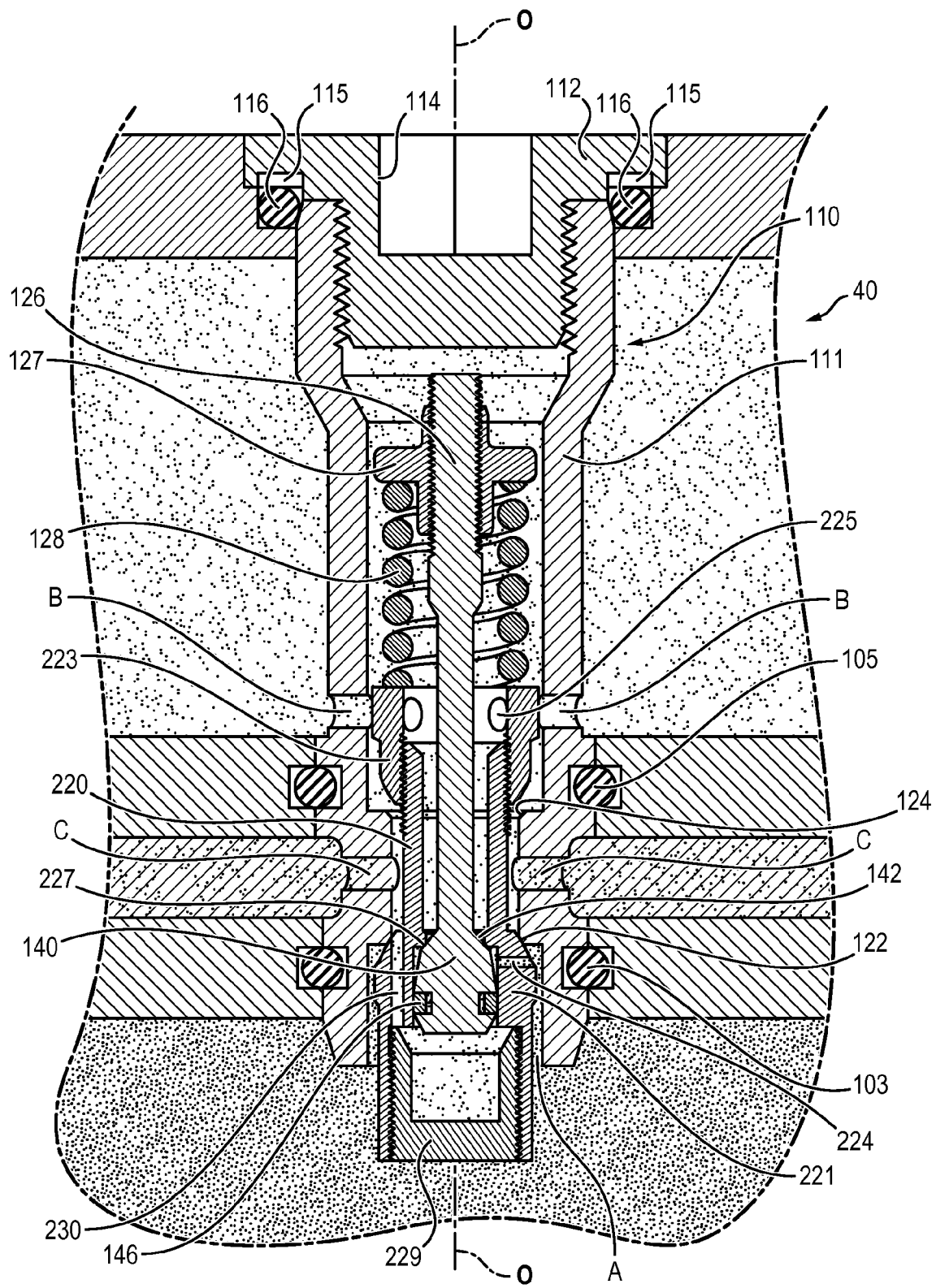
Figure 14:
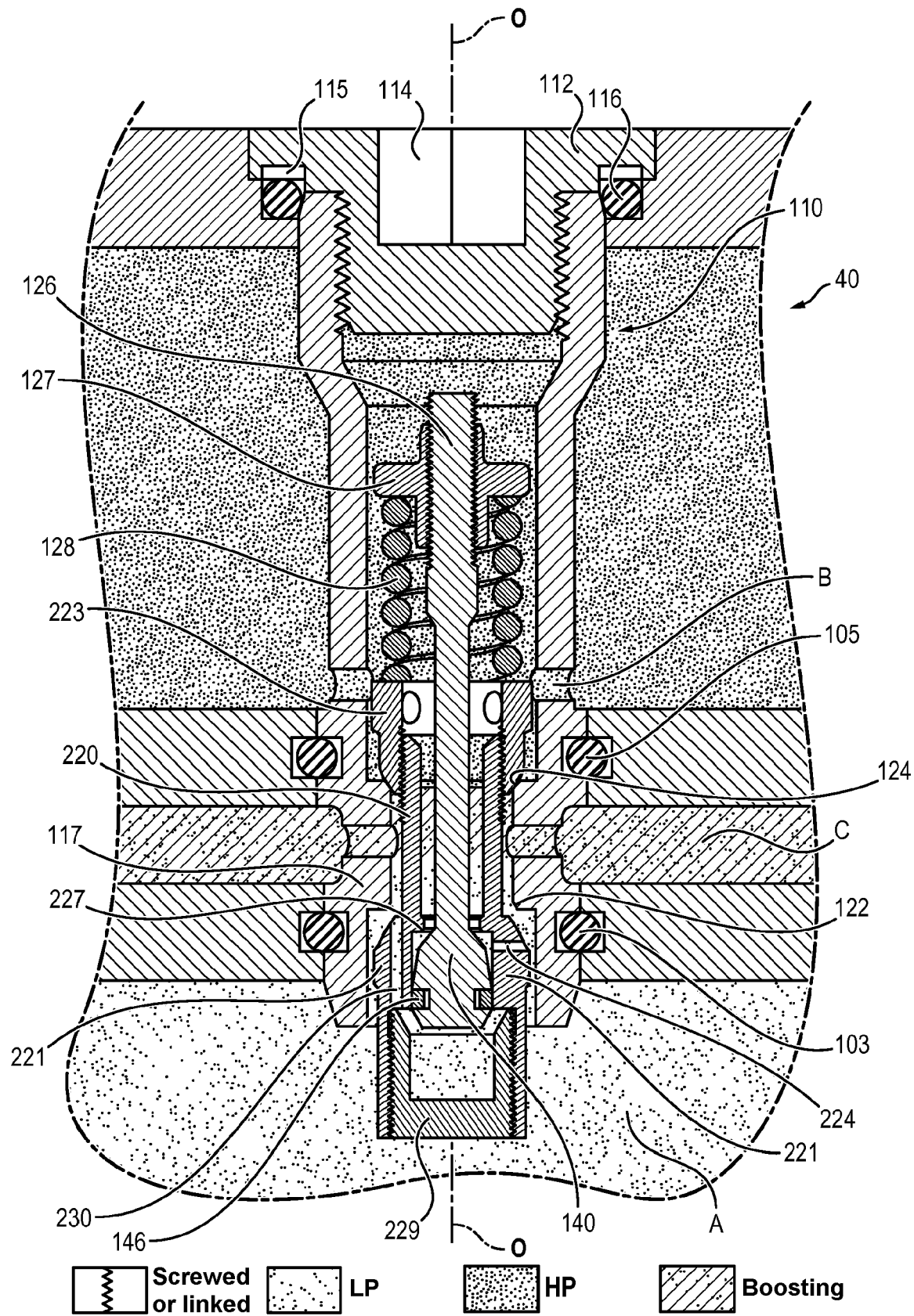
Figure 15:
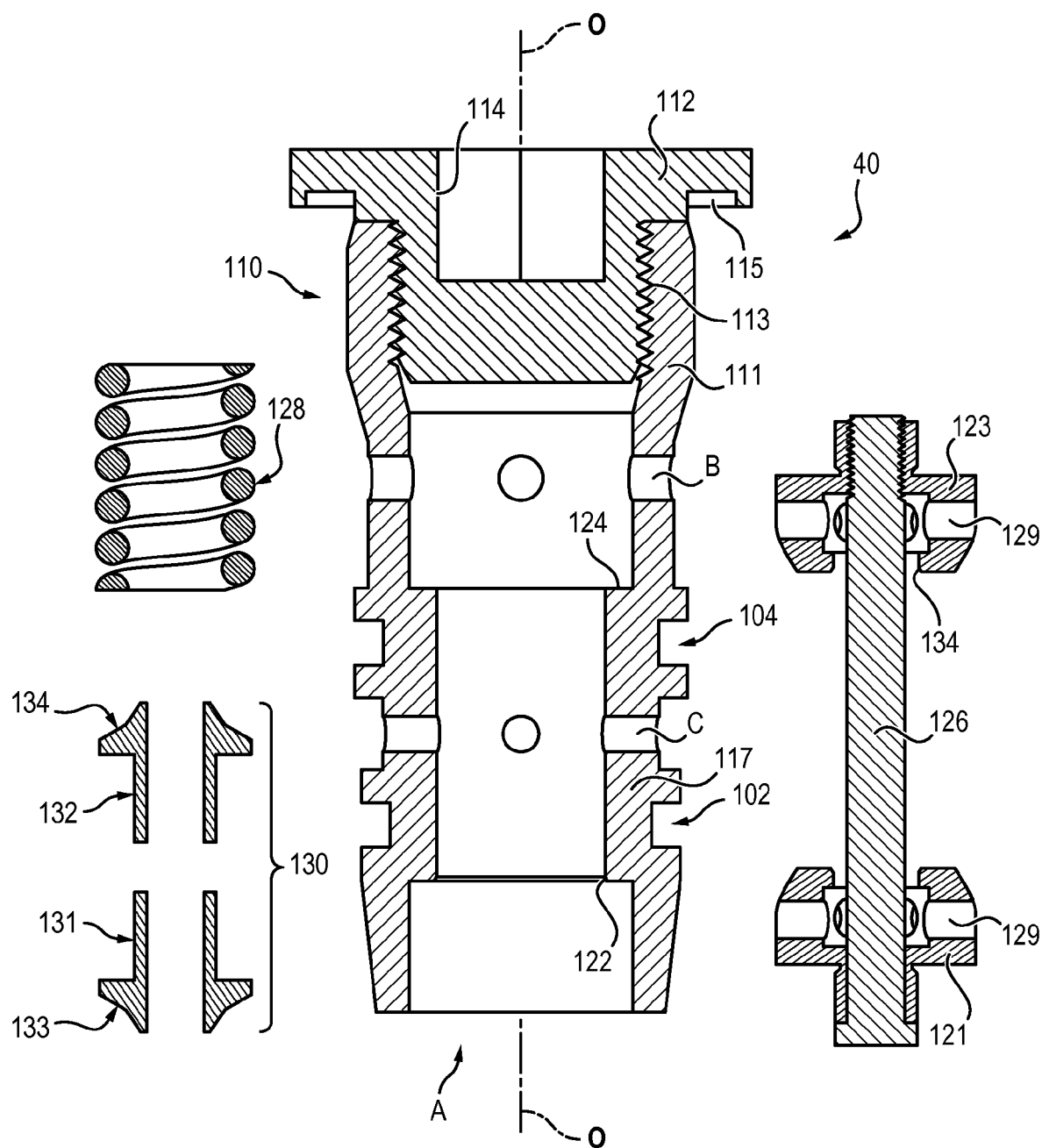
Figure 16:
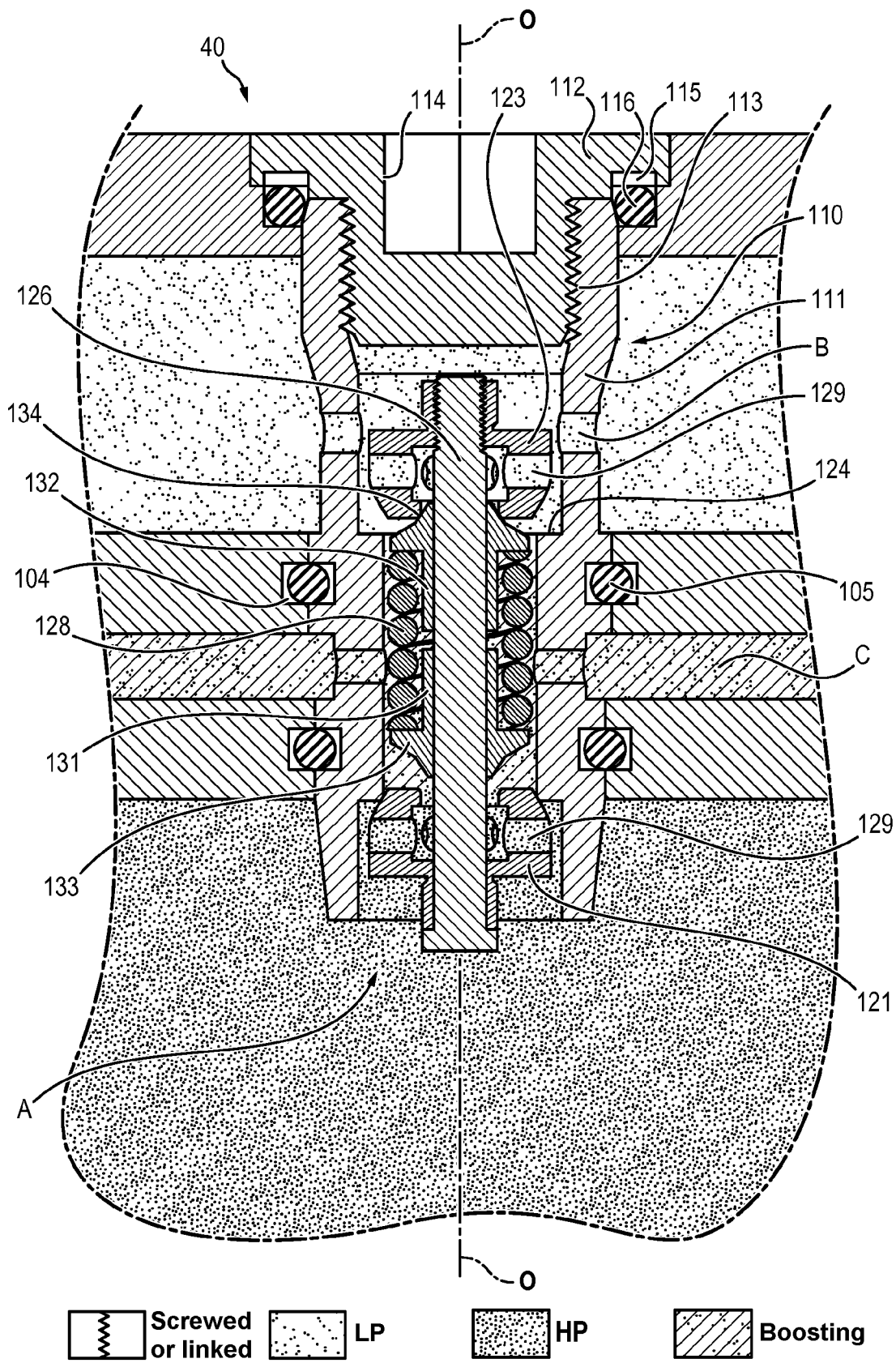
Figure 17:
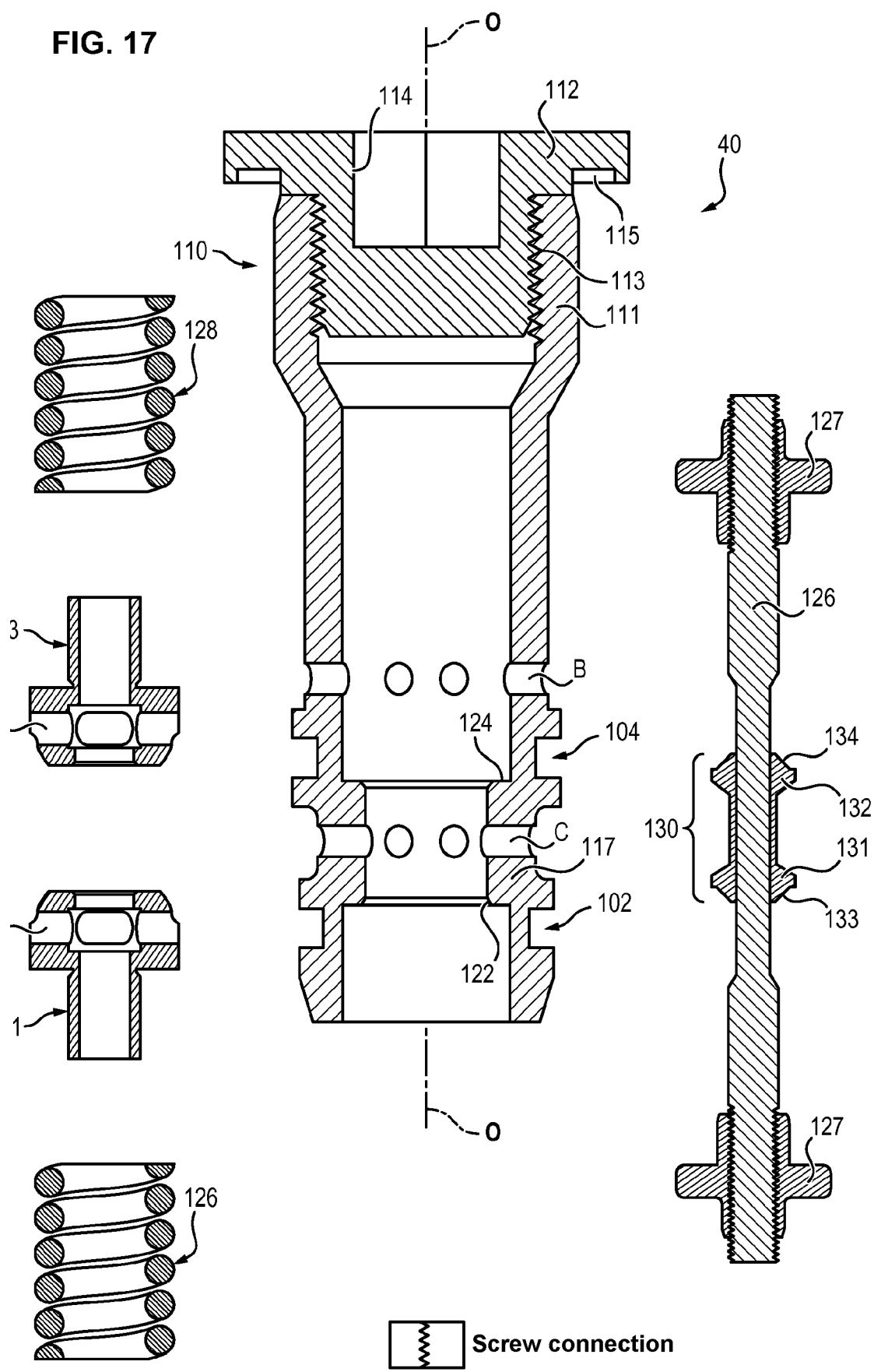
Figure 18:
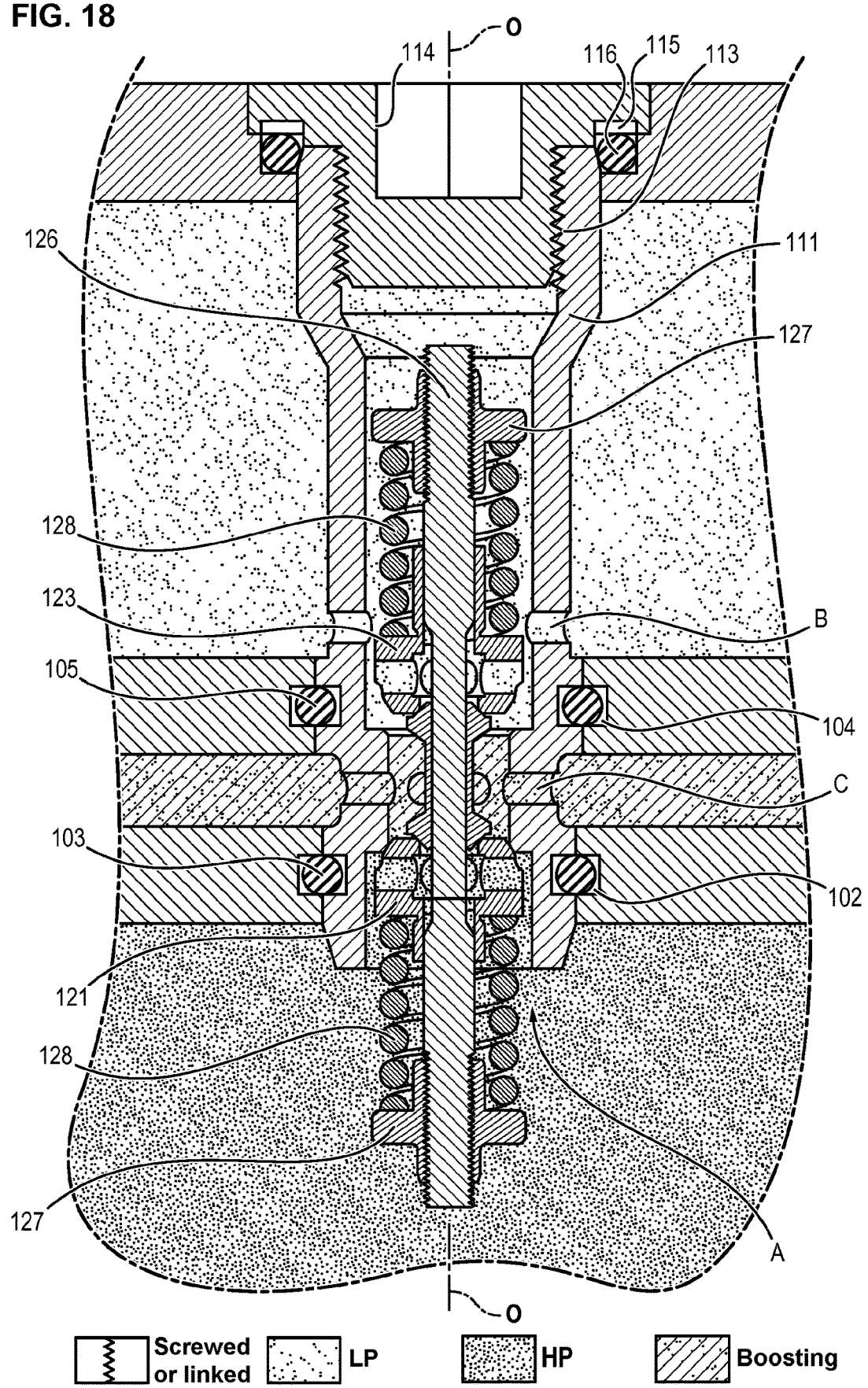
Figure 19:
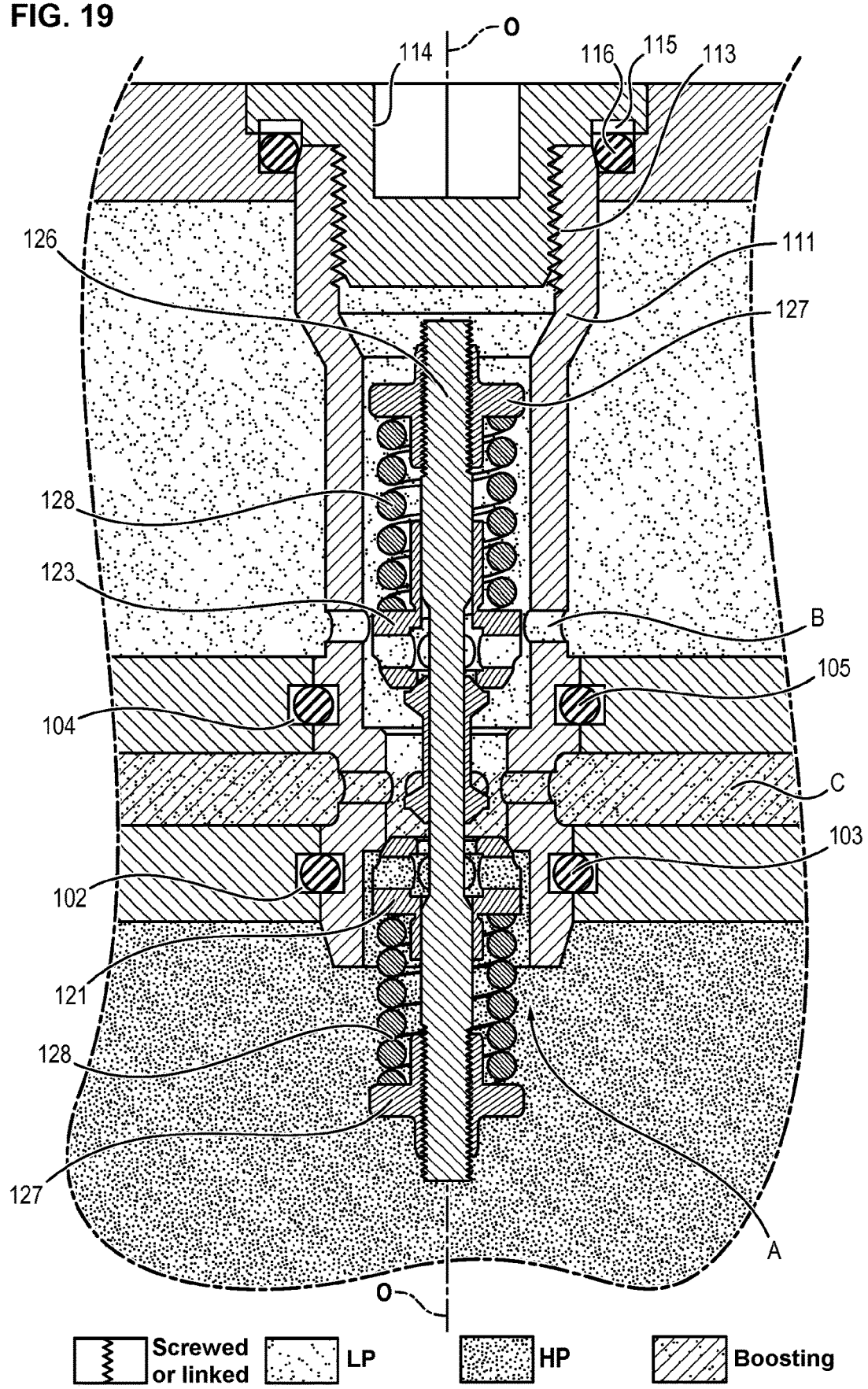
Figure 20:
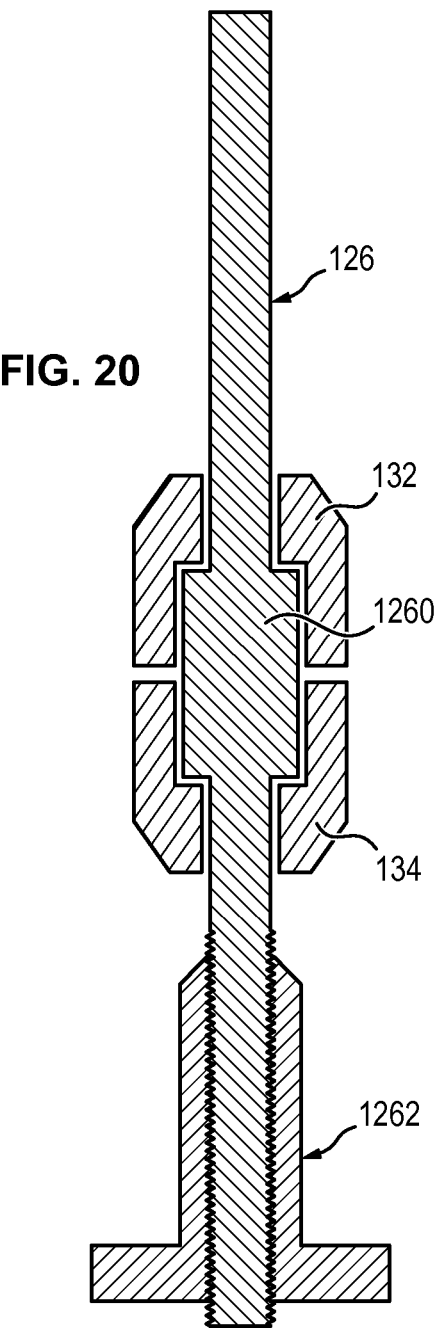
Figure 21:
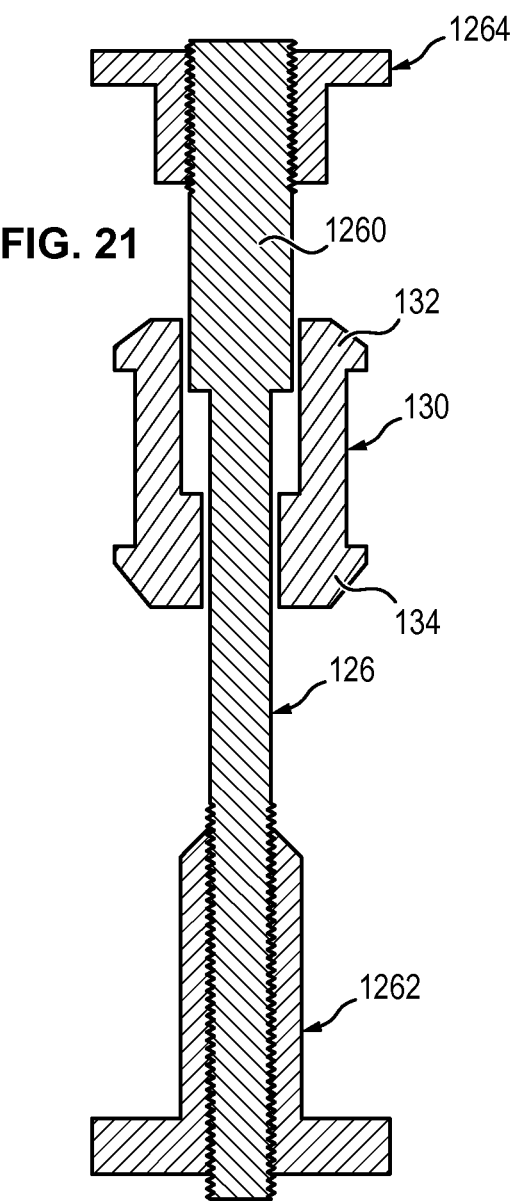

Other features, aims and advantages of the invention will be revealed from the description that follows, which is purely illustrative and not limiting, and which must be read with reference to the appended drawings, wherein:

FIGS. 1 to 3 show variants of the prior art,

FIG. 4 shows schematically an assistance circuit integrating a pressure relief device 40 conforming to the invention which integrates means which perform the same function as the two check valves B11 and B12 and the two limiters 21 and 22 or 23, 24 or 25, 26 shown in FIGS. 1 to 3, FIG. 5 shows schematically the structure of a device conforming to a first variant of the invention, FIG. 6 shows separately the different parts composing the first variant conforming to the invention, FIG. 7 shows a view similar to FIG. 5 but after movement of a selector valve due to a reversal of the high-pressure line with respect to FIG. 5, FIG. 8 shows another view of the first variant of the invention during passage of a first line into excess pressure, FIG. 9 shows another view of the first variant of the invention during passage of the second line into excess pressure, FIG. 10 shows a possible adaptation of the first variant of the invention, FIG. 10 bis is a first partial enlarged view of FIG. 10 and illustrates the damping chamber formed between two shoulders made respectively on the stem and on the excess pressure plug body, the volume whereof varies during a relative movement between these two elements to generate a damping effect due to oil flowing in a leakage channel which communicates with the chamber and which is formed between the stem and the excess pressure plug body, FIG. 11 shows separately the different parts composing a second variant conforming to the invention, FIG. 12 shows the same second variant of the invention in a selection position corresponding to an application of the high pressure through the intake opening situated in the lower portion of the figure, the boost consequently escaping through the low-pressure line communicating with the openings situated in the upper portion of the figure, FIG. 13 shows another view of the second variant of the invention during passage of a first line into excess pressure, FIG. 14 shows another view of the second embodiment of the invention during passage of the second line into excess pressure, FIG. 15 shows separately the different parts composing a third variant conforming to the invention, FIG. 16 shows the same third variant of the invention in a state of application of a high pressure on the line which communicates with the intake opening situated in the lower portion of the figure, this in the event of excess pressure, FIG. 17 shows separately the different parts composing a fourth variant conforming to the invention, FIG. 18 shows the same fourth variant in a selection position by application of the high pressure on a line which communicates with the opening situated in the lower portion of the figure, FIG. 19 shows the same fourth variant of the invention in the event of application of excess pressure on the line which communicates with the opening situated in the lower portion of the figure, FIGS. 20 and 21 show two variant embodiments of means for damping the relative movement of plugging means on the stem, and FIG. 22 shows another variant embodiment conforming to the present invention.

FIG. 4 shows an assistance system conforming to the invention integrating a pressure relief device 40 conforming to the invention which integrates means which perform the same function as the two check valves B11 and B12 and the two limiters 21 and 22 or 23, 24 or 25, 26 shown in FIGS. 1 to 3. The device 40 comprises three ports 42, 44, 46: two ports 42, 44 which communicate respectively with the feed lines 11 and 12 and a port 46 which communicates with the booster line 10, 30. The structures of four variants of components 40 conforming to the invention are shown in FIG. 5 and following, as well as their operation, and will now be described.

As shown in FIGS. 5 to 10, a first variant of the pressure relief device 40 comprises essentially a body 110, a selector valve 120 which forms two check valves, and a central element 130 forming two relief valves.

The pressure relief device 40 is centered on a longitudinal symmetry axis O-O. The pressure relief device 40 is axially symmetrical overall around the axis O-O.

The body 110 is formed from a cartridge suitable for being integrated in any support structure, for example on the casing of a hydraulic motor.

The body 110 is preferably formed by assembling a casing 111 and a cap 112. The cap 112 may be attached to an axial end of the casing 111 by any appropriate means, for example by crimping or preferably by screwing at complementary threads 113. The cap 112 may be equipped with a non-axially symmetrical shape 114 allowing it to be tightened, as well as a recess 115 suitable for receiving a seal 116 in contact with the support structure.

The casing 111 comprises at least three through passages A, B and C which correspond respectively to the three aforementioned ports 42, 44, 46.

One of the through passages C is formed in the middle portion of the length of the casing 111 and corresponds to the port 46. More precisely, several openings C are preferably provided equally distributed around the axis O-O, thus forming the port 46.

The passages A and B are formed respectively on either side of the middle passage C. More precisely, the passage B is preferably formed from several openings equally distributed around the axis O-O, thus forming the port 44.

The passage A may also be formed from several openings equally distributed around the axis O-O, thus forming the port 42. However, according to the preferred embodiment, for reasons of manufacture and assembly, the passage A is formed from an opening which leads axially on the casing 111 at the end opposite the cap 112.

The casing 110 preferably comprises on its outer surface two annular recesses 102, 104 disposed between the passages A, B and C, designed to receive respective seals 103, 105 in contact with the support structure and allowing the hydraulic connections provided toward the passages A, B and C to be mutually isolated.

The casing 111 comprises on its inner surface and at the middle passage C a narrowed portion 117 which extends axially on either side of the passage C. The narrowed portion 117 defines respectively on its two axial ends two seats 122, 124 associated with the selector valve 120. The narrowed portion 117 which forms the two seats 122, 124 may be integrally formed on the inner surface of the casing 111 or be formed of a separate part applied to the surface of the casing 111 and attached by any appropriate means, for example by crimping.

The two seats 122, 124 are oriented respectively toward the axial ends of the casing 111.

The selector valve 120 comprises two plugs 121 and 123, which are configured to cooperate respectively with the seats 122 and 124 formed in the casing 111 so as to form two check valves.

When the plug 121 is supported against the seat 122, the check valve corresponding to the selector valve 120 is closed, the fluid connection is cut between the passage A and the passage C (between the port 42 and the port 46) as long as the pressure of the oil remains below a predetermined threshold.

Equivalently, when the plug 123 is supported against the seat 124, the corresponding check valve of the selector valve 120 is closed, the fluid connection is cut between the passage B and the passage C (between the port 44 and the port 46) as long as the pressure of the oil remains below a certain threshold.

The surface portions of the plugs 121 and 123 designed to rest on the seats 122 and 124 are preferably frusto-conical.

The selector valve 120 also comprises a stem 126 centered on the axis O-O and on which the two plugs 121 and 123 are attached. More precisely, the plug 121 is held fixed on a first end of the stem 126, for example by screwing, and the plug 123 is slidably mounted on the stem 126. The stem 126 may slide inside the body 110, the position of the stem 126 inside the body 110 being a function of the pressure of the oil which enters into said body 110 through the passages A and B.

So as to be able to be attached to the stem 126, the plug 121 has an opening directed along the axis O-O passing through its center when the plug 121 is mounted in the body 110, said opening receives the stem 126. Equivalently, the plug 123 also has an opening directed along the axis O-O passing through its center when said plug 123 is mounted in the body 110, which receives the stem 126. The plugs 121 and 123 also comprise radial openings 129 which are oriented radially with respect to the axis O-O when the plugs 121 and 123 are placed in the body 110. The radial openings communicate with the openings through which the stem 126 passes through the plugs 121 and 123, so that the oil may circulate inside the plugs 121 and 123 by entering through the radial openings 129 and leaving by the openings through which the stem 126 passes through the plugs 121 and 123, or by entering through the openings through which the stem 126 runs through the plugs 121 and 123 and leaving by the radial openings 129.

Still more precisely, each plug 121, 123 has the general shape of a poppet, the widened head whereof accommodates the aforementioned radial through openings 129 and the foot whereof has the shape of a cylindrical barrel engaged on the stem 126. The two plugs 121 and 123 are mounted head to tail, their head directed toward one another and toward the interposed central element 130. These two heads define the respective seats 133 and 134 for the ends of the facing central element, to form relief valves as will be seen hereafter.

The diameter of the aforementioned seats 133 and 134 is greater than the outer diameter of the stem 126.

The radial openings 129 will allow the pressure coming from the intakes A and B to be applied to the portions of end surface of the central element 130 circumscribed by the seats 133 and 134.

The selector valve 120 comprises a stop 127 attached to a second end of the stem 126 (the end opposite to that to which the plug 121 is attached), as well as a setting spring 128 which is supported on the stop 127 and on the plug 123, and which tends to cause the plug 123 to slide toward the plug 121.

The stop 127 is preferably screwed or crimped or welded in an adjustable position on the stem 126.

The central element 130 which forms two relief valves is slidably mounted on the stem 126 between the two plugs 121 and 123. The central element 130 comprises a first end 131 and a second end 132 which are configured so that the first end 131 cooperates with the plug 121 so as to form a first relief valve, and that the second end 132 cooperates with the plug 123 so as to form a second relief valve. More precisely, the first end 131 of the central element 130 cooperates with the plug 121 so that the edge of the opening through which the stem 126 passes through the plug 121 forms a seat 133 on which the first end 131 of the central element 130 may rest so as to prevent the oil from passing through the opening through which the stem 126 passes through the plug 131. Equivalently, the second end 132 of the central element 130 cooperates with the plug 123 so that the edge of the opening through which the stem 126 passes through the plug 123 forms a seat 134 on which the second end 132 of the central element 130 may rest so as to prevent the oil from passing through the opening through which the stem 126 passes through the plug 133.

The surface portions of the ends of the central element 130 designed to rest on the seats 133 and 134 are preferably frusto-conical.

The central element 130 thus preferably has the shape of a spool or dual-wheel comprising a central cylindrical barrel provided with two excrescences respectively on its ends, said excrescences defining relief valve plugs which cooperate with the seats 133 and 134.

It is therefore understood that, when the pressure of the oil is less than a predetermined threshold, the setting spring 128 pushes the plug 123 in the direction of the plug 121, thus pressing the first end 131 and the second end 132 of the central element 130 on their respective seats 133 and 134. The value of the predetermined threshold of the oil pressure at which the setting spring 128 is no longer able to press the first end 131 and the second end 132 of the central element 130 on their respective seats 133 and 134 may be adjusted by varying the length or the stiffness of the setting spring 128, or the position of the stop 127 on the stem 126.

It is therefore understood that the stem 126 operates in tension under the biasing of the setting spring 128 which pushes, on the one hand, the stop 127, and on the other hand the plug 121 (via the plug 123 and the central element 130).

Moreover, the central element 130 has a length which is greater than the length of the narrowed portion 117 (more precisely, a length such that the distance separating the surfaces of the plugs which cooperate with the seats 122 and 124 is greater than the distance separating these seats 122 and 124), so that the plugs 121 and 123 cannot be supported on their respective seats 122 and 124 simultaneously; only one of the plugs 121 or 123 being capable of being supported on its seat 122 or 124 at a given instant.

The central element 130 illustrated in FIGS. 5 to 10 is formed of a one-piece body. As a variant, the central element 130 may be formed of several separate elements juxtaposed axially.

To sum up, the first embodiment shown in FIGS. 5 to 9 comprises a body 110, for example a cartridge body, comprising three intakes A, B and C designed to be connected respectively to two feed lines and to one booster line, said cartridge body has a narrowed portion 117 defining two selector seats 122, 124, a selector valve 120 comprising a rigid stem 126 and two plugs 121, 123, one 121 of the plugs being rigidly connected to a first end of the stem 126, and the second plug 123 being slidably mounted on the stem 126, an adjustable stop 127 on the second end of the stem 126 and a spring 128 interposed between the adjustable stop 127 and the second plug 123, each of the two selector plugs 121, 123 defining a relief valve seat 133, 134, and means forming a dual relief valve comprising a body in the shape of a dual-wheel 130 slidably mounted on the stem 126 and defining two plugs 131, 132 placed facing the relief valve seats 133, 134.

The operation of the pressure relief device 40 during the different possible phases of use of the hydraulic machine wherein said pressure relief device 40 is disposed will now be described.

FIG. 5 shows a phase of use in which the first line 11 is at the high pressure (high pressure at passage A), and the second line 12 is at the low pressure (low pressure at passage B). Thus, the pressure of the oil which enters the body 110 through the passage A being greater than the pressure of the oil applied to the body 110 by the passage B, the plug 121 is pushed by the pressure of the oil onto its seat 122 (thus closing the associated check valve), while the plug 123 is moved away from its seat 124 (thus opening the associated check valve).

The oil which leaves the booster line 10, 30 and which enters into the body 110 by the passage C may therefore penetrate into the second line 12 (low-pressure line) by passing by the selection valve which is open, while the oil which leaves the first line 11 and which returns to the body 110 by the passage A is blocked by the check valve 121/122 which is closed.

The pressure of the oil not exceeding the predetermined threshold set by the setting spring 128, the relief valves are closed (the first end 131 of the central element 130 is supported on its seat 133, and the second end 132 of the central element 130 is also supported on its seat 134).

FIG. 7 shows a phase of use which is the reverse of the phase shown in FIG. 5, the first line 11 being at the low pressure (low pressure in passage A), while the second line 12 is at the high pressure (high pressure in passage B). Thus, the pressure of the oil which enters into the body 110 through passage B being greater than the pressure of the oil applied to passage A, the plug 123 is pushed onto its seat 124 by the pressure of the oil (thus closing the associated check valve), while the plug 121 is moved away from its seat 122 (thus opening the associated check valve). The oil which leaves the booster line 10, 30 and which enters into the body 110 by the passage C may therefore penetrate into the first line 11 (low-pressure line) by passing through the selection valve which is open, while the oil which leaves the second line 12 and which enters to the body 110 by the passage B is blocked by the check valve which is closed.

The pressure of the oil not exceeding the predetermined threshold set by the setting spring 128, the relief valves are closed (the first end 131 of the central element 130 is supported on its seat 133, and the second end 132 of the central element 130 is also supported on its seat 134).

FIG. 8 shows a phase of use in which the first line 11 has excess pressure (excess pressure in passage A) and the second line 12 is at low pressure (low pressure in passage B). Thus, the pressure of the oil which enters the body 110 by the passage A being greater than the pressure of the oil applied to passage B, the plug 121 is pushed onto its seat 122 by the pressure of the oil (thus closing the associated check valve), while the plug 123 is moved away from its seat 124 (thus opening the associated check valve).

However, the pressure of the oil exceeding the predetermined threshold set by the setting spring 128 (excess pressure), a relief valve opens. More precisely, the oil under excess pressure presses on the first end 131 and forces the setting spring 128 to compress, thus causing the first end 131 to detach from its seat 133 (thus opening the relief valve). Thus, the oil under excess pressure may be discharged into the second line 12 and the booster line 10, 30 so as to prevent an excessive pressure rise of the oil in the first line 11 and deterioration of the hydraulic machine.

FIG. 9 shows a phase of use which is the reverse of the phase shown in FIG. 8, the second line 12 having excess pressure (excess pressure in passage B), and the first line 11 having low pressure (low pressure in passage A). Thus, the pressure of the oil which enters the body 110 by the passage B being greater than the pressure of the oil applied to the passage A, the plug 123 is pushed onto its seat 124 by the pressure of the oil (thus closing the associated check valve), while the plug 121 is moved away from its seat 122 (thus opening the associated check valve).

However, the pressure of the oil exceeding the predetermined threshold set by the setting spring 128 (excess pressure), a relief valve opens. More precisely, the oil under excess pressure is supported on the second end 132 and forces the setting spring 128 to compress, thus causing the second end 132 to separate from its seat 134 (thus opening the relief valve). Thus, the oil under excess pressure may be discharged into the first line 11 and the booster line 10, 30 so as to prevent an excessive pressure rise of the oil in the second line 12 and deterioration of the hydraulic machine.

According to one possible adaptation of the first variant of the invention illustrated in FIGS. 5 to 9, as illustrated in FIGS. 10 and 10 bis, the central element 130 comprises a damping means. In fact, the occurrence of excess pressure in one line of the circuit of the hydraulic machine is a sudden event and, the pressures used being considerable (on the order of 400 bars), the opening of a relief valve may be sudden and cause premature wear of the pressure relief device 40. The damping means also allows the oscillations of the setting spring 128 to be limited. In order to damp the movement of the central element 130 along the stem 126 in the event of excess pressure, an annular damping cavity 136 is created between the stem 126 and the central element 130, the size of the damping cavity 136 depending on the position of the central element 130 on the stem 126. Moreover, the central cavity 136 fluidly communicates with the inside of the casing 111 through an annular damping channel 139, the difference between the outer diameter and the inner diameter whereof is less than the difference between the outer diameter and the inner diameter of the damping cavity. Hereafter, "the difference between the outer diameter and the inner diameter" of the damping cavity or of the damping channel will be called the "radial thickness" of the damping cavity or of the damping channel.

As shown in FIG. 10, the damping cavity 136 is formed by a difference in diameter between the diameter of the stem 126 and the diameter of the bore in the central element 130 in which the stem 126 slides. This difference in diameter is created by a shoulder 137 made on the stem 126, so that a portion of the stem 126 situated after the shoulder 137 has a diameter greater than the portion of the stem 126 situated before the shoulder 137. A shoulder 138 complementary to the shoulder 137 made on the stem 126 is made in the bore of the central element 130. Thus, a portion of the bore of the central element 130 situated after the shoulder 138 has a diameter greater than the portion of the bore of the central element 130 situated before the shoulder 138.

The damping cavity 136 is created by the volume defined along the stem 126 between the shoulder 138 formed in the bore of the central element 130 and the shoulder 137 formed on the stem 126 and delimited furthermore by the outer surface of the stem 126 and the inner surface of the central element 130.

The damping channel 139 is formed by the annular space defined between the central element 130 and the stem 126, on the outside of the cavity 136. More precisely, the damping channel 139 is formed by the fact that the bore of the central element 130 has an inner diameter greater than the outer diameter of the stem 126, in particular to allow the central element 130 to slide on the stem 126.

Thus, the position of the central element 130 on the stem 126 is such that, when no excess pressure occurs, the shoulder 137 of the stem 126 and the shoulder 138 of the bore of the central element 130 are offset, thus forming a damping cavity 136.

The damping cavity 136 is filled with oil, said damping cavity 136 being fluidly connected inside the body 110 by the damping channel 139.

When excess pressure occurs at the intake A, the central element 130 slides along the stem 126 moving away from the plug 121, reducing the length of the damping cavity 136 by bringing the two shoulders 137 and 138 closer together. The damping cavity 136 is compressed, and its length therefore tends to decrease due to the movement of the central element 130 along the stem 126. The movement of the central element 130 is damped by the expulsion of the oil situated inside the damping cavity 136 through the damping channel 139.

Then, when the excess pressure has disappeared, the damping cavity is expanded again, and therefore its length tends to increase due to the movement of the central element 130 along the stem 126, the movement of the central element being damped again by aspiration in the damping cavity of oil situated in the body 110, through the damping channel 139.

In fact, the radial thickness of the damping channel 139 being less than the radial thickness of the damping cavity 136, the circulation of oil inside the exhaust channel 139 damps the movement of the central element 130.

Furthermore, it will be observed that the aforementioned steps 137 and 138 allow different diameters to be defined on the two ends of the central element 130, for the stem 126 and the central element 130, and consequently different surface amplitudes subjected respectively to the pressures coming from the intakes A and B. This disposition allows different opening thresholds to be adapted for the two relief valves, despite the presence of a single biasing spring 128.

According to the embodiment illustrated in FIG. 10, the body of the cartridge is formed of two complementary parts assembled and held together thanks to an expansion ring 1000 making the assembly non-dismountable.

Other variants of damping means will be described hereafter with reference to FIGS. 20 and 21.

The second embodiment, in conformity with the present invention, shown in the appended FIGS. 11 to 14 will now be described.

As shown in FIGS. 11 to 14, a second variant of the pressure relief device comprises essentially a body 110 which houses a selector valve 120 which forms two check valves, and a stem 126 which comprises a plug 140 forming two relief valves.

The body 110 of the second variant of the pressure relief device 40 is similar to the body 110 of the first variant.

The device is centered on a longitudinal axis of symmetry O-O. The device is axially symmetrical overall around the axis O-O.

FIGS. 11 to 14 show a cartridge 110 conforming to the invention integrating a pressure relief device conforming to the invention which integrates means which carry out the function of a pressure selector valve 120 and two pressure limiters grouped in a common assembly 140.

The device comprises a body 110 which has three ports A, B, C: two ports A, B which communicate respectively with the lines 11 and 12, and one port C which communicates with the booster line 10.

The booster line 10 may be fed with oil by the booster pump P until it attains the boost pressure, which makes the machines M1, M2 operational, or the booster line 10 may be aspirated by the booster pump, which makes the machines M1, M2 non-operational. The machines M1 and M2 are of a type which becomes non-operational, or unclutchable, below a pressure threshold in the lines 11 and 12. The selector connects automatically the lower pressure line to the boost, which allows activation or deactivation of the transmission which is smooth and orderly.

The body 110 is formed from a cartridge suitable for being integrated in any support structure, for example on the casing of a hydraulic motor.

The body 110 is preferably formed by assembling a casing 111 and a cap 112. The cap 112 may be attached to one axial end of the casing 111 by any appropriate means, for example by crimping or preferably by screwing at complementary threads 114. The cap 112 may be equipped with a non-axially-symmetrical shape 113 allowing it to be clamped, as well as a recess 115 suitable for receiving a seal 116 in contact with the support structure. The axial end of the casing 111 may be equipped on its outer surface with a thread 1210 allowing assembly of the device 100 on this support structure.

One of the through passages C is formed in the middle portion of the length of the casing 111. More precisely, several openings C equally distributed around the axis O-O are preferably provided.

The passages A and B are formed respectively on either side of the middle passage C. More precisely, the passage B is preferably formed of several openings equally distributed around the axis O-O.

The passage A may also be formed from several openings equally distributed around the axis O-O. However, according to the preferred embodiment, for reasons of manufacture and assembly, the passage A is formed from an opening which leads axially on the casing 111 to the opposite end of the cap 112.

The casing 111 preferably comprises on its outer surface two annular recesses 102, 104 disposed between the passages A, B and C, designed to receive respective seals 103, 105 in contact with the support structure and allowing the hydraulic connections provided toward the passages A, B and C to be isolated from one another.

Identically to the first variant, the casing 111 comprises, on its inner surface and at the middle passage C, a narrowed portion 117 which extends axially on either side of the passage C. The narrowed portion 117 defines respectively on its two axial ends, the two seats 122 and 124 associated with the selector valve 120.

The narrowed portion 117 which forms the two seats 122, 124 may be integrally formed on the inner surface of the casing 111 or be formed from a separate part applied to the surface of the casing 111 and attached by any appropriate means, for example by screwing, crimping or welding.

The two seats 122, 124 are oriented respectively toward the opposite axial ends of the casing 111.

The selector valve 120 has the general shape of a dual-wheel formed from a central cylinder 220 with a constant rotationally symmetrical cross-section, provided on its two axial ends with respective excrescences projecting from its outer surface. These two excrescences or projections respectively form two annular plugs 221 and 223 directed respectively toward the middle portion of the dual-wheel forming a selector valve 120, suitable for cooperating with the seats 122, 124 formed on the casing 111.

The outer diameter of the central cylinder 220 is less than the inner diameter of the narrowed portion 117. The outer diameter of the plugs 221, 223, on the other hand, is greater than the diameter of the seats 122, 124.

The plugs 221, 223 are configured to cooperate respectively with the seats 122 and 124. More precisely, when one of the plugs 221, 223 rests on the associated seat 122, 124, the corresponding valve of the selector valve 120 is closed.

Conversely, when a plug 221, 223 is separated from the associated seat 122, 124, the corresponding valve of the selector valve 120 is open.

The selector valve 120 is movable in translation inside the casing 111, the plugs 221, 223 and their associated seats 122, 124 form stops for the selector valve 120 in its movement inside the casing 111.

The length of the central cylinder 220 is greater than the length of the narrowed portion 117 (the distance between the seats 122 and 124). Thus, when one of the selection valves is closed, the other selection valve is automatically open.

The use of a selector valve 120 comprising a cage 220 on the ends whereof are formed the respective plugs 221, 223 of two selection valves, makes it possible to guarantee a constant distance between the two plugs 221, 223 and consequently allows guaranteeing that when one of the selection valves is closed, the other selection valve is automatically opened.

The central cylinder 220 defines an axial through passage designed to receive a plug 140 slidingly and an associated support stem 162 forming two relief valves. The central cylinder 220 also comprises a plurality of radial through openings 225.

The openings 225 allow free filing of the inner volume of the selector valve 120 and the discharge of the fluid during opening of a relief valve, as will be seen later.

The central cylinder 220 and the two plugs 221, 223 may be formed integrally from a single part. As illustrated in FIGS. 11 to 14, at least one of the plugs 221, 223 may however be formed from a part applied and attached to the central cylinder 220 to facilitate the creation and assembly of the device.

As may be seen in FIGS. 11 to 14, an annular protrusion, which serves as a seat 227 for the plug 140, is provided on one end of the central cylinder 220 and on the inner surface thereof.

The plug 140 is formed from an excrescence on one end of the stem 126. The plug 140 is placed facing the seat 227, in the volume of the inner chamber of the central cylinder 220.

To allow the assembly of the widened plug 140 on the seat 227, the central cylinder 220 preferably comprises an end cap 229 screwed to the end of the central cylinder 220 after installation of the plug 140.

The stem 126 emerges axially on the end of the selector valve 120 opposite to the plug 140. The stem 126 and its associated plug 140 are biased in tension toward one axial end of the casing 111 by a setting spring 128.

Thus, the plug 140 is urged to press against the seat 227.

The spring 128 is interposed on the stem 126, between the plug 223 and a stop 127 in the shape of a ring carried by the stem 126.

Preferably, the stop 127 is adjustable in position over the length of the stem 126 to define the force exerted by the setting spring 128 and consequently the oil pressure threshold required to open the relief valve. The stop 127 may be attached in position on the stem 126 by any appropriate means, for example by screwing or crimping.

As indicated previously the plugs 221, 223 and the central cylinder 220 are advantageously formed of at least two parts, preferably of three parts, initially separated and assembled by any appropriate means, for example by screwing or crimping, as may be seen in FIGS. 11 to 14. According to FIGS. 11 to 14, the plug 223 is formed from an element initially separated from the central cylinder 220, but suitable for being applied and attached thereto by any appropriate means, for example by screwing.

Even more precisely, the central cylinder 220 of selector valve comprises radial through passages 224 formed on its axial end outside the seat 227, between the seat 227 and a sealing segment 146 carried by the plug 140.

Still more precisely, the selector body 220 includes radial through passages 224 formed on its axial end on the exterior of the seat 227, between the seat 227 and a sealing segment 146 carried by the plug 140.

Moreover, the axial end of the plug 140 directed toward the seat 227 is preferably in the shape of a cone frustum 141. More precisely, the frusto-conical surface 141 preferably comprises two axially juxtaposed portions 142 and 143 having different taper ratios.

The portion 142 of this frusto-conical surface 141 rests on the seat 227. The portion 142 of this frusto-conical surface 141 which is accessible on the inside of the inner chamber of the selector valve 120 is subjected to the pressure coming from the passage B. It is this portion 142 of the frusto-conical surface 141 which defines the force resulting from the pressure of the passage B allowing the force of the setting spring 128 to be overcome and therefore opening the relief valve in the event of excess pressure in the passage B.

On the other hand, the portion 143 of the frusto-conical surface 141 which is disposed on the outside of the seat 227 is subjected to the pressure coming from the passage A via the aforementioned through passages 224. It is this portion 143 of the frusto-conical surface 141 which defines the force resulting from the pressure of the passage A allowing the force of the spring 128 to be overcome, and therefore opening the relief valve in the event of excess pressure in the passage A.

As may be seen in FIGS. 11 to 14, the taper ratio of the two elementary portions 142 and 143 of the surface 141 may be different to adapt the opening thresholds of the valve under the effect of the pressures respectively of the passage B and the passage A.

Moreover, the widened portion of the plug 140 is guided in translation along the axis O-O of the device in a complementary portion of the body and has here a seal or annular seal segment 146.

The sealing is provided by cooperation between the surface 142 and the seat 127, on the one hand, and between the segment 146 and the complementary cylindrical surface which surrounds it on the other hand. As may be seen on examining FIGS. 11 to 14, the plug 140 has two surfaces situated on either side of the associated seat 227 formed on the central cylinder 220 and subjected respectively to the pressures coming from the two feed lines A and B.

Moreover, the device comprises confinement means suitable for applying the pressure of the port A to a localized limited zone of the plug 140. More precisely, these confinement means are formed by the seal or annular seal segment 146 and by the channels 224. Thus, the pressure that prevails in the feed line associated with port A applies only to the face of the plug 140 situated outside the seat 227, more precisely at the surface delimited between the seat 227 and the segment 146.

To allow free displacement of the plug 140 in the housing formed by the cap 229 applied to the end of the central cylinder 220, longitudinal channels 230 are preferably provided which form a purge channel and connect this internal housing of the selector valve to the port C.

The purge channel 230 allows the movement of the plug 140, and has a damping function if the cross-section of the channel 230 is reduced.

To assemble the pressure relief device 40 previously described, the procedure is essentially as follows.

First of all, the plug 140 and its stem 126 equipped with the setting spring 128 and the stop 127, are assembled to the central cylinder 220 of the selector valve 120 without the plug 223, the plug 140 being placed facing the seat 227. The stop 127 is adjusted in position for the desired setting. The closure cap 229 is attached to the central cylinder 220.

The subassembly of the relief valve and selector valve thus formed is introduced into the casing 11 through an end thereof, preferably the one opposite to the cap 112. The plug 223 is attached to the central cylinder 220 of the selector valve 120.

To this end, the outer surface of the central cylinder 220 of the selector valve 120 may be provided with gripping shapes accessible by the passages C to facilitate assembly.

Then, the cap 112 is attached to the end of the casing 111. The seals 116 are placed in their respective recesses 115.

The device illustrated in FIGS. 11 to 14 further comprises at least two translation guides for the plug 140, separated, along the longitudinal translation direction O-O thereof, by a distance equal to at least one time the diameter of the plug 140 resting on the associated seat 227, preferably a distance equal to at least two times this diameter and very advantageously, as illustrated in FIGS. 11 to 14, equal to at least five times this diameter.

Even more precisely, as illustrated in FIGS. 11 to 14, the device comprises a first translation guide for the plug 140 formed by the cooperation defined between the tapered end 142 of the plug 140 and its associated seat 227 and at least one second guide formed by the second end of the plug stem 126 guided on the body at the aforementioned collar 127 defining the support of the spring 128. These two guides are separated typically by a distance at least equal to 5 times the diameter of the seat 227.

As may be seen in FIGS. 11 to 14, the device further comprises a third translation guide for the plug formed by the widened portion 140 provided with the seal or segment 146 which move in a channel of complementary diameter formed on the body 220 of the selector.

Such multiple guide allows to obtain a good reliability of the device, without however penalizing the cumulative longitudinal space requirement of the two plugs because, according to FIGS. 11 to 14, the two relief valves are grouped on common means.

It is understood that the stem 126 associated with the plug 140 operates in tension under the biasing of the spring 128.

The operation of the relief device is essentially the following:

At rest, in the absence of pressure on the port C and therefore in the booster line 10, 30 and consequently on the ports A, B and therefore in the feed lines 11, 12, the selector valve 120 is capable of free movement in the casing 111 facing the seats 122, 124. The plug 140 is pressed on the seat 227 by the spring 128, the relief valve being consequently closed. The stem 126 is tensioned by the setting spring 128.

In operation, during the activation of the booster pump and of a selection of the direction of rotation of the machine M1, one of the ports A or B is subjected to a high pressure while the other portion A or B is subjected to a low return pressure.

The selector valve 120 is thus impinged upon by the high pressure.

If, as illustrated in FIG. 12, the high pressure is applied to the port A, the plug 221 of the selector valve 120 is pressed against the seat 122. The corresponding selection valve is therefore closed. Conversely, a low pressure is applied to port B. The plug 223 of the selector valve 120 is separated from the seat 124. The corresponding selection valve is therefore open.

As may be seen in FIG. 14, in case of inversion of the direction of rotation, the high pressure is applied to the port B. The plug 223 of the selector valve 120 is pressed against the seat 124. The corresponding selection valve is therefore closed. Conversely, a low pressure is applied to port A. The plug 221 of the selector valve 120 is separated from the seat 122. The corresponding selection valve is therefore open.

The operation of the selector valve 120 is identical during the commissioning or the deactivation of the hydraulic machines, by the use of the booster pump in the sense of causing oil to enter the closed loop or to have oil leave the closed loop.

When the pressure in a line 11, 12, exceeds the set threshold of the relief valves defined by the spring 128, this excess pressure applied to the plug 140 ensures the opening of one of the relief valves, as illustrated in FIGS. 13 and 14 by the separation of the plug 140 with respect to the seat 227. The corresponding excess pressure is then discharged toward the booster line 10 as well as toward the other feed line.

The opening of the relief valve shown in FIG. 13 is due to excess pressure coming from line A and applied to the surface 142 situated outside of the seat 227 via the passages 224. That shown in FIG. 14 is due to excess pressure coming from line B and applied to the surface 142 situated inside of the seat 227.

In summary, the second embodiment shown in FIGS. 11 to 14 comprises a body 110, for example a cartridge body comprising three intakes A, B and C designed to be connected respectively to two feed lines and to one booster line, said cartridge body has a narrowed portion 117 defining two selector seats 122, 124, a selector valve 120 in the shape of a cage comprising two widened portions on its ends forming two plugs facing the selector seats and having an internal relief valve seat and means forming a dual relief valve comprising a rigid stem 126 and a plug connected rigidly to a first end of the stem 126 facing the relief valve seat, the plug of the relief valve comprising two biasing surfaces placed respectively on either side of the relief valve seat and exposed respectively to the pressures applied to the two intakes designed to be connected to the feed lines and a spring mounted between an adjustable stop 127 on the second end of the stem 126 and the selector valve.

The third embodiment conforming to the present invention shown in the appended FIGS. 15 and 16 will now be described.

The third embodiment illustrated in FIGS. 15 and 16 comprises essentially a body 110, for example a cartridge body comprising three intakes A, B and C designed to be connected to two feed lines and to one booster line, said cartridge body has a narrowed portion 117 defining two selector seats 122, 124, a selector valve 120 comprising a rigid stem 126 and two plugs 121, 123, connected rigidly to respective ends of the stem 126, the position of at least one of these two plugs 121 123 being preferably adjustable on the stem 126, each of the two selector plugs 121, 123 defining a relief valve seat 133, 134, two relief valves comprising two separate plugs 131, 132 slidably mounted on the stem between the selector plugs and a spring 128 interposed between the two relief valve plugs 131, 132.

Found again in this third embodiment shown in the appended FIGS. 15 and 16:

a pressure relief device 40 centered on a longitudinal axis of symmetry O-O and axially symmetric overall around the axis O-O.

a body 110 formed from a cartridge adapted to be integrated in any support structure, for example on the casing of a hydraulic motor.

the body 110 is preferably similar to the body 110 of the first variant, the body 110 being preferably formed by assembling a casing 111 and a cap 112. The cap 112 may be attached to an axial end of the casing 111 by any appropriate means, for example by crimping or preferably by screwing at complementary threads 113. The cap 112 may be equipped with a non-axially-symmetrical shape 114 allowing it to be tightened, as well as a recess 115 suitable for receiving a seal 116 in contact with the support structure.

the casing 111 comprises at least three through passages A, B and C which correspond respectively to the three aforementioned ports 42, 44, 46. One of the through passages C is formed in the middle portion of the length of the casing 111 and corresponds to the port 46. More precisely, preferably several openings C equally distributed around the axis O-O are provided, thus forming the port 46. The passages A and B are formed respectively on either side of the middle passage C. More precisely, preferably, the passage B is formed of several openings equally distributed around the axis O-O, thus forming the port 44. The passage A may also be formed of several openings equally distributed around the axis O-O, thus forming the port 42. However, according to the preferred embodiment, for reasons of manufacturing and assembly, the passage A is formed of an opening which leads axially to the casing 111 at the end opposite to the cap 112.

two annular recesses 102, 104, formed on the casing 110, disposed between the passages A, B and C, designed to receive the respective seals 103, 105 in contact with the support structure and allowing the hydraulic connections provided toward the passages A, B, and C to be mutually isolated.

a narrowed portion 117 formed on the inner surface of the casing 111 at the middle passage C and which extends axially to either side of the passage C. The narrowed portion 117 defines respectively on its two axial ends two seats 122, 124 associated with the selector valve 120. The narrowed portion 117 which forms the two seats may be integrally formed on the inner surface of the casing 111 or be formed of a separate part applied to the surface of the casing 111 and attached by any appropriate means, for example by crimping. The two seats, 122, 124 are oriented respectively toward the axial ends of the casing 111.

The selector valve 120 comprises two plugs 121 and 123, which are configured to cooperate respectively with the seats 122 and 124 formed in the casing 111 so as to form two check valves.

When the plug 121 is supported against the seat 122, the corresponding check valve of the selector valve 120 is closed, the fluid connection is cut between the passage A and the passage C (between the port 42 and the port 46) as long as the pressure of the oil remains below a predetermined threshold.

Equivalently, when the plug 123 is supported against the seat 124, the corresponding check valve of the selector valve 120 is closed, the fluid connection is cut between the passage B and the passage C (between the port 44 and the port 46) as long as the pressure of the oil remains below a certain threshold.

The surface portions of the plugs 121 and 123 designed to rest on the seats 122 and 124 are preferably frusto-conical.

The selector valve 120 also comprises a stem 126 centered on the axis O-O. The two plugs 121 and 123 are attached respectively to the ends of the stem 126, for example by screwing or any equivalent means. More precisely, preferably at least one of the two plugs 121, 123 is adjustable in longitudinal position on the stem 126.

The stem 126 may slide inside the body 110, the position of the stem 126 inside the body 110 being a function of the pressure of the oil which enters said body 110 by the passages A and B.

Each of the two plugs 121 and 123 is of similar geometry to the plugs 121 and 123 previously described with reference to FIGS. 5 to 9. Each of the two selector plugs 121 and 123 thus defines a seat 133 and 134 designed to accommodate a relief valve plug 131, 132.

In order to be able to be attached to the stem 126, the plug 121 has an opening directed along the axis O-O passing through its center when the plug 121 is mounted in the body 110, said opening receives the stem 126. Equivalently, the plug 123 also has an opening directed along the axis O-O passing through its center when said plug 123 is mounted in the body 110, which receives the stem 126. The plugs 121 and 123 also comprise radial openings 129 which are oriented radially with respect to the axis O-O when the plugs 121 and 123 are placed in the body 110. The radial openings communicate with the openings by which the stem 126 passes through the plugs 121 and 123, so that the oil may circulate inside the plugs 121 and 123 by entering through the radial openings 129 and leaving by the openings through which the stem 126 passes through the plugs 121 and 123, or by entering by the openings through which the stem 126 passes through the plugs 121 and 123 and leaving by the radial openings 129.

More precisely still, each plug 121, 123 has the general shape of a poppet, the widened head whereof accommodates the aforementioned radial through openings 129 and the foot whereof has the shape of a cylindrical barrel engaged on the stem 126. The two plugs 121 and 123 are mounted head to tail, their head directed toward one another and toward the aforementioned interposed central element 130. These two heads define respective seats 133 and 134 for the relief valve plugs 131 and 132 placed facing.

The diameter of the aforementioned seats 133 and 134 is greater than the outer diameter of the stem 126.

The radial openings 129 allow the pressure coming from the intakes A and B to be applied to the portions of the end surface of the plugs 131, 132 of the relief valves, circumscribed by the seats 133 and 134.

The means 130 forming a dual relief valve comprise two relief plugs 121 and 133 slidably mounted on the stem 126 between the two plugs 121 and 123.

The surface portions of the ends of the plugs 131 and 132 designed to rest on the seats 133 and 134 are preferably frusto-conical.

Each plug 131 and 132 preferably comprises a cylindrical barrel engaged on the body of the stem 126 to provide guidance in sliding the plugs 131 and 132 on the stem 126 and a widened head directed toward its respective seat 133 and 134 defined on a selection valve plug 121 and 123.

The selector valve 120 further comprises a setting spring 128 which is interposed between the two relief valve plugs 131 and 133, more precisely between the widened heads of these two plugs.

It is therefore understood that, when the pressure of the oil is less than a predetermined threshold, the setting spring 128 biases the relief plugs 131 and 132 against their respective seats 133 and 134. The value of the predetermined threshold of the oil pressure at which the setting spring 128 is no longer able to press the relief plugs 131 and 132 against their respective seat 133 and 134 may be adjusted by varying the length or the stiffness of the setting spring 128, or the position of one of the plugs 121 or 123 on the stem 126.

It is understood that, as for the foregoing embodiments, the stem 126 operates in tension under the biasing of the setting spring 128 which biases the relief plugs 131 and 132 and the selector plugs 121 and 123.

Moreover, the sum of the lengths of the two relief plugs 131 and 132 is greater than the length of the narrowed portion 117 (more precisely the sum of these lengths is such that the distance separating the surfaces of the plugs 121 and 123 which cooperate with the seats 122 and 124 is greater than the distance separating these seats 122 and 124), so that the plugs 121 and 123 cannot be pressed onto their respective seats 122 and 124 simultaneously, only one of the plugs 121 or 123 being able to be supported on its seat 122 or 124 at a given instant.

The general operation of the pressure relief device 40 shown in FIGS. 15 and 16 will now be described during the different possible phases of use of the hydraulic machine in which is disposed said pressure relief device 40.

FIG. 16 shows a phase of use in which the first line 11 is at the high pressure (high pressure in the passage A) and the second line 12 is at the low pressure (low pressure in passage B). Thus, the pressure of the oil which enters the body 110 through the passage A being greater than the pressure of the oil applied to the body 110 by the passage B, the plug 121 is pushed by the pressure of the oil on its seat 122 (thus closing the associated check valve), while the plug 123 is moved away from its seat 124 (thus opening the associated check valve).

The oil which leaves the booster line 10, 20 and which enters the body 110 by the passage C may therefore penetrate into the second line 12 (low-pressure line) by passing by the selection valve which is open, while the oil which leaves the first line 11 and which enters the body 110 by the passage A is blocked by the check valve 121/122 which is closed.

Moreover, the pressure of the oil at the passage A exceeding the predetermined threshold set by the setting spring 128, the relief valve formed by the plug 131 is open (the plug 131 is separated from its seat 133 while the plug 132 is supported on its seat 134).

In the event of reversed excess pressure at the intake B, the disposition of the selector valve 120 and of the relief valves would be reversed: the selector plug 123 would rest on its seat 124 while the plug 132 would be separated from its seat 134, while the selector plug 121 would be separated from its seat 122 and the plug 131 would be supported on its seat 133.

And if the pressure on the intakes A and B does not exceed the excess pressure threshold defined by the setting of the spring 128, the two plugs 131 and 132 rest on their respective seats 133 and 134.

If applicable, the plugs 131 and 132 of the third embodiment shown in FIGS. 15 and 16 may be provided with damping means comparable to those defined previously with reference to FIG. 10. In the case of the third embodiment, however, the damping means may act in both directions of relative movement between the stem 126 and the relief plugs, and therefore regardless of the intake providing an excess pressure feed.

The fourth embodiment conforming to the present invention shown in the appended FIGS. 17 to 19 will now be described.

The fourth embodiment illustrated in FIGS. 17 to 19, comprises essentially a body 110, for example a cartridge body, comprising three intakes A, B and C designed to be connected respectively to two feed lines and to one booster line, said cartridge body has a narrowed portion 117 defining two selector seats 122, 124, a selector valve 120 comprising a rigid stem 126 and two plugs 121, 123 slidably mounted on the stem 126, two adjustable stops 127 attached respectively to the ends of the stem 126 and two springs 128 interposed respectively between an adjustable stop 127 and an associated plug 121, 123 to bias each of the selector plugs against its associated seat, each of the two selector plugs 121, 123 defining a relief valve seat 133, 134 and means forming relief valves comprising a body in the shape of a dual-wheel interposed between the selector plugs and defining two plugs 131, 132 placed facing the relief valve seats, the body of the relief valve being slidably mounted on the stem between the selector plugs or free to slide on the stem between the selector plugs.

According to one variant, the two relief plugs are formed from separate bodies.

Found again in this fourth embodiment shown in the appended FIGS. 17 to 19:

a pressure relief device 40 centered on a longitudinal axis of symmetry O-O and axially symmetric overall around the axis O-O.

a body 110 formed from a cartridge suitable for being integrated in any support structure, for example on the casing of a hydraulic motor.

the body 110 is preferably similar to the body 110 of the first variant, the body 110 being preferably formed by assembling a casing 111 and a cap 112. The cap 112 may be attached to an axial end of the casing 111 by any appropriate means, for example by crimping or preferably by screwing at complementary threads 113. The cap 112 may be equipped with a non-axially-symmetrical shape 114 allowing it to be tightened, as well as a recess 115 suitable for receiving a seal 116 in contact with the support structure.

the casing 111 comprises at least three through passages A, B and C which correspond respectively to the three aforementioned ports 42, 44, 46. One of the through passages C is formed in the middle portion of the length of the casing 111 and corresponds to the port 46. More precisely, preferably, several openings C equally distributed around the axis O-O are provided, thus forming the port 46. The passages A and B are formed respectively on either side of the middle passage C. More precisely, preferably, the passage B is formed from several openings equally distributed around the axis O-O, thus forming the port 44. The passage A may also be formed from several openings equally distributed around the axis O-O, thus forming the port 42. However, according to the preferred embodiment, for reasons of manufacturing and assembly, the passage A is formed from an opening which leads axially to the casing 111 at the end opposite to the cap 112.

two annular recesses 102, 104 formed on the casing 110, disposed between the passages A, B and C, designed to receive respective seals 103, 105 in contact with the support structure and allowing the hydraulic connections provided toward the passages A, B and C to be mutually isolated.

a narrowed portion 117 formed on the inner surface of the casing 111 at the middle passage C and which extends axially on either side of the passage C. The narrowed portion 117 defines respectively on its two axial ends two seats 122, 124 associated with the selector valve 120.

The narrowed portion 117 which forms the two seats 122, 124 may be integrally formed on the inner surface of the casing 111 or be formed from a separate part applied to the surface of the casing 111 and attached by any appropriate means, for example by crimping. The two seats 122, 124 are oriented respectively toward the axis ends of the casing 111.

The selector valve 120 comprises two plugs 121 and 123, which are configured to cooperate respectively with the seats 122 and 124 formed in the casing 111 so as to form two check valves.

When the plug 121 is supported against the seat 122, the corresponding check valve of the selector valve 120 is closed, the fluid connection is cut between the passage A and the passage C (between the port 42 and the port 46) as long as the pressure of the oil remains less than a predetermined threshold.

Equivalently, when the plug 123 is supported against the seat 124, the corresponding check valve of the selector valve 120 is closed, the fluid connection is cut between the passage B and the passage C (between the port 44 and the port 46) as long as the pressure of the oil remains below a certain threshold.

The surface portions of the plugs 121 and 123 designed to rest on the seats 122 and 124 are preferably frusto-conical.

The selector valve 120 also comprises a stem 126 centered on the axis O-O. The two plugs 121 and 123 are slidably mounted on the stem 126 along the axis O-O.

The stem 126 may slide inside the body 110, the position of the stem 126 inside the body 110 being a function of the pressure of the oil which enters into said body 110 by passages A and B.

Each of the two plugs 121 and 123 has a geometry similar to the plugs 121 and 123 previously described with reference to FIGS. 5 to 9. Each of the two selector plugs 121 and 123 thus defines a seat 133 and 134 designed to accommodate a relief valve plug 131, 132.

In order to be able to be attached to the stem 126, the plug 121 has an opening directed along the axis O-O passing through its center when the plug 121 is mounted in the body 110, said opening receives the stem 126. Equivalently, the plug 123 also has an opening directed along the axis O-O passing through its center when said plug 123 is mounted in the body 110 and receives the stem 126. The plugs 121 and 123 also comprise radial openings 129 which are oriented radially with respect to the axis O-O when the plugs 121 and 123 are placed in the body 110. The radial openings communicate with the openings by which the stem 126 passes through the plugs 121 and 123, so that the oil may circulate inside the plugs 121 and 123 by entering by the radial openings 129 and leaving by the openings by which the stem 126 passes through the plugs 121 and 123, or by entering by the openings through which the stem 126 passes through the plugs 121 and 123 and leaving by the radial openings 129.

Even more precisely each plug 121, 123 has the general shape of a poppet, the widened head whereof accommodates the aforementioned radial through openings 129 and the foot whereof has the shape of a cylindrical barrel engaged on the stem 126. The two plugs 121 and 123 are mounted head to tail, their head directed toward one another and toward the interposed central element 130. These two heads define respective seats 133 and 134 for the relief valve plugs 131 and 132 placed facing.

The diameter of the aforementioned seats 133 and 134 is greater than the outer diameter of the stem 126.

The radial openings 129 allow the pressure coming from the intakes A and B to be applied to the end surface portions of the plugs 131, 132 of the relief valves, circumscribed by the seats 133 and 134.

The means forming a dual relief valve comprise a part 130 in the shape of a dual-wheel, the two widened ends whereof respectively constitute two relief plugs 121 and 122 disposed facing the seats 133 and 134.

The dual-wheel-shaped part 130 may be slidably mounted on the stem 126, or attached rigidly to the stem 126, between the two plugs 121 and 123.

The surface portions of the ends of the plugs 131 and 132 designed to rest on the seats 133 and 134 are preferably frusto-conical.

The selector valve 120 further comprises two stops 127 attached respectively to the ends of the stem 126, as well as two setting springs 128 which are respectively interposed between a stop 127 and one of the two plugs 121 and 123. Thus, the springs 128 bias each selector plug 121, 123 toward the plug 131, 132 associated respectively with the dual relief valve.

At least one of the stops 127 is preferably screwed in an adjustable position on the stem 126.

It is therefore understood that, when the pressure of the oil is less than a predetermined threshold, the setting springs 128 bias the relief plugs 131 and 132 against their respective seat 133 and 134. The value of the predetermined thresholds of oil pressure at which the setting springs 128 are no longer able to press the relief plugs 131 and 132 against their respective seat 133 and 134 may be adjusted by varying the length or the stiffness of each setting spring 128, or the position of one of the stops 127 on the stem 126.

It is therefore understood that, as for the foregoing embodiments, the stem 126 operates in tension under the biasing of the setting springs 128 which bias the relief plugs 131 and 132 and the selector plugs 121 and 123.

Moreover, the length of the part forming the two relief valves 131 and 132 is greater than the length of the narrowed portion 117 (more precisely, this length is such that the distance separating the surfaces of the plugs 121 and 123 which cooperate with the seats 122 and 124 is greater than the distance separating these seats 122 and 124), so that the plugs 121 and 123 cannot be supported on their respective seat 122 and 124 simultaneously, only one of the plugs 121 or 123 being able to be supported on its seat 122 and 124 at a given instant.

If applicable, the two plugs 131, 132 of the relief valve may be formed, not from a single part 130, but from two separate parts set back to back, which are attached to the stem 126, or free in translation thereon.

A person skilled in the art will understand that the plugs 131 and 132 are attached to the stem 126 or free to slide thereon, the setting spring 128 which intervenes to control the opening of the relief valve, in the event of excess pressure, differs.

When the plugs 131 and 132 are attached to the stem 126, the spring 128 which intervenes for controlling the opening of a relief valve 131 or 132, in the event of excess pressure, is essentially the spring 128 associated with the same selector plug 121 or 123.

On the other hand, when the plugs 131 and 132 are free to slide on the stem 126, the spring 128 which intervenes for controlling the opening of a relief valve 131 or 132, in the event of excess pressure, is essentially the spring 128 associated with the other selector plug 123 or 121, because it is this spring which operates in compression.

We will now describe the general operation of the pressure relief device 40 shown in FIGS. 17 to 19 during the different possible phases of use of the hydraulic machine in which said pressure relief device 40 is disposed.

FIG. 18 shows a phase of use in which the first line 11 is at the high pressure (high pressure in passage A), and the second line 12 is at the low pressure (low pressure in passage B). Thus, the pressure of the oil which enters the body 110 by the passage A being greater than the pressure of the oil applied to the body 110 by the passage B, the plug 121 is pushed by the pressure of the oil onto its seat 122 (thus closing the associated check valve), while the plug 123 is moved away from its seat 124 (thus opening the associated check valve).

The oil which leaves the booster line 10, 30 and which enters into the body 110 by the passage C may therefore penetrate into the second line 12 (low-pressure line) by passing through the selection valve which is open, while the oil which leaves the first line 11 and which returns into the body 110 by the passage A is blocked by the check valve 121/122 which is closed.

Moreover, according to FIG. 18, the pressure of the oil at the passage A not exceeding the predetermined threshold set by the associated setting spring 128, the relief valve formed by the plug 131 is closed (the plug 131 rests on its seat 133 and likewise the plug 132 is supported on its seat 134).

In the event of reverse excess pressure on the intake B, the disposition of the selector valve 120 would be reversed: the selector plug 123 would rest on its seat 124 while the plug 132 would be separated from its seat 134.

And if the pressure on one of the intakes A and B exceeds the excess pressure threshold defined by the setting of the associated spring 128, the corresponding plug 131 and 132 separates from its respective seat 133 or 134, as illustrated in FIG. 19, to ensure discharge of the excess pressure toward the booster line and/or the other feed line.

If applicable, the plug means 131 and 132 of the fourth embodiment shown in FIGS. 17 to 19 may be provided with damping means comparable to those defined previously with reference to FIG. 10, when these plug means 131 and 132 are slidably mounted on the stem 126, whether the plug means 131 and 132 are made in the shape of a single part or in the shape of two separate parts.

In the case of the fourth embodiment, however, the damping means may act in both directions of relative movement between the stem 126 and the relief plugs, and therefore regardless of which feed intake is under excess pressure.

A person skilled in the art will understand that the implementation conforming to the invention allows all the functions to be integrated into a component in the shape of a cartridge while allowing simple and reliable, as well as independent adjustment of the setting of each relief valve.

The invention may thus be integrated or juxtaposed with one of the machines M1, M2.

The creation of the cartridge body with a removable cap allows simple adjustment of the opening pressure threshold of the relief valves. It is in fact sufficient to withdraw the cap 112 to gain access to the adjusting elements or the spring(s) 128, adjust them, then put the cap 112 back in place.

Naturally the present invention is not limited to the particular embodiments which have just been described, but extends to all variants within its spirit.

Moreover, the device conforming to the present invention in the shape of an autonomous cartridge suitable for being attached, for example by screwing, in a complementary housing formed in a support body, was described previously.

As a variant, as illustrated in FIG. 22 however, it is possible to omit the cartridge body and dispose the elements constituting the selector valve 120 and the relief valves directly in the block of the machined support body, provided that the same shapes and the same function are provided on this support body block. In the case where the support body block thus includes a narrowed portion 117 defining the two seats 122, 144, it is necessary for assembly to provide access from both sides of this narrowed section. It is then necessary to provide two closure caps for closing these access points. Such a disposition facilitates installation and adjustment.

Shown schematically in FIGS. 17 to 19 is a plug body 130 in the shape of a dual-wheel applied to a stem 126 carrying two excrescences on its ends. In practice, to allow the assembly of such a structure, the dual-wheel-shaped part must be formed from two complementary shells applied in diametrically opposite position to the stem 126, or the stem 126 must itself be formed from two parts assembled together.

Shown in FIGS. 20 and 21 are different variant embodiments of dampers conforming to the present invention.

FIG. 20 shows a stem 126 having an excrescence 1260 on its length. Two plugs 132 and 134 are engaged on the stem 126, respectively on either side of the excrescence 1260. Each plug 132, 134 has a portion with an inner diameter complementary to the stem 126 and a portion with an inner diameter complementary to the excrescence 1260. There is thus defined between each plug 132, 134 and the stem 126 having the excrescence 1260 a chamber of variable volume which damps the relative movement between each plug 132, 134 and the stem 126 by controlled leakage of oil at the calibrated annular channel defined between the respective plug 132, 134 and the stem 126.

It may be seen in FIG. 20 that, to allow the assembly of a plug 134 to the stem 126, a widened stop 1262 provided on the associated end of the stem 126 is not integrally formed on the stem 126, but applied to this stem 126.

The damping means shown in FIG. 20 allow damping of the relative movement in both movement directions.

FIG. 21 illustrates another variant embodiment suitable for damping the movement in a single movement direction.

According to FIG. 21 a stem 126 is provided having an excrescence 1260 on one of its ends. A dual-wheel-shaped body 130 defining two plugs 132 and 134 is engaged on the stem 126, facing the excrescence 1260. The body 130 has a portion with an inner diameter complementary to the stem 126 and a portion with an inner diameter complementary to the excrescence 1260. There is thus defined between the body 130 and the stem 126, at the excrescence 1260, a chamber of variable volume which damps the relative movement between the body 130 and the stem 126, by controlled leakage of oil at the calibrated annular channel defined between the body 130 and the stem 126.

It is seen in FIG. 21 that, to allow the assembly of the body 130 to the stem 126, a widened stop 1262 provided on the associated end of the stem 126, is not integrally formed on the stem 126, but attached to this stem 126. The same may be true of a second stop 1264 provided on the opposite end of the stem 126.

The invention claimed is:

1. A pressure relief device suitable to be installed in a system comprising a first feed line (11) and a second feed line (12) and a discharge and/or booster line (10),
wherein the relief device comprises two valves (131, 132, 133, 134) associated respectively with one of the two feed lines (11, 12) and are for opening in the event of excess pressure above a predetermined threshold on the associated feed line so as to discharge the corresponding excess pressure toward the discharge and/or booster line (10) or toward the other feed line (11, 12), the two valves include valve plugs (131, 132) and a common support stem (126) which operates in tension under the biasing of at least one spring (128) defining a setting which corresponds to said predetermined threshold, the pressure relief device further comprising:

a selector (120) having two selector plugs (121, 123), two selector seats (122, 124), and wherein only one of the selector plugs (121, 123) rests on its seat at a given instant and the two selector plugs (121, 123) are held away by the valve plugs (131, 132).

2. The device according to claim 1, wherein the pressure relief device integrates two check valves (121, 122, 123, 124) associated respectively with one of the two feed lines (11, 12), for boosting.

3. The device according to claim 1, wherein the at least one spring comprises a single setting spring (128).

4. The device according to one of claims 1 or 2, wherein the device comprises two setting springs (128), associated respectively with the two pressure relief valves (131, 132, 133, 134).

5. The device according to claim 1, wherein the device comprises a cartridge body (110) comprising three intakes (A, B and C) designed to be connected respectively to two feed lines and to one booster line, said cartridge body having a narrowed portion (117) defining the two selector seats (122, 124), the selector forming a selector valve (120) and comprising a rigid stem (126) and the two selector plugs (121, 123), one (121) of the selector plugs being rigidly connected to a first end of the stem (126), and the second plug (123) being slidably mounted on the stem (126), an adjustable stop (127) on the second end of the stem (126) and a spring (128) interposed between the adjustable stop (127) and the second selector plug (123), each of the two selector plugs (121, 123) defining a relief valve seat (133, 134), and a dual relief valve comprising a body in the shape of a dual-wheel (130) slidably mounted on the stem (126) and defining the two valve plugs (131, 132) placed facing the relief valve seats (133, 134).

6. The device according to claim 1, wherein the device comprises a cartridge body (110) comprising three intakes (A, B and C) designed to be connected respectively to two feed lines and to one booster line, said cartridge body having a narrowed portion (117) defining the two selector seats (122, 124), the selector valve (120) in the shape of a cage comprising two widened portions on its ends forming the two selector plugs facing the selector seats and having an internal relief valve seat and a dual relief valve comprising a rigid stem (126) and a plug connected rigidly to a first end of the stem (126) facing the relief valve seat, the plug of the relief valve comprising two biasing surfaces placed respectively on either side of the relief valve seat and exposed respectively to the pressures applied to the two intakes designed to be connected to the feed lines and a spring mounted between an adjustable stop (127) on the second end of the stem (126) and the selector valve.

7. The device according to claim 1 wherein the device comprises essentially a body (110) comprising three intakes (A, B and C) designed to be connected respectively to two feed lines and to one booster line, said cartridge body has a narrowed portion (117) defining two selector seats (122, 124), a selector valve (120) comprising a rigid stem (126) and two plugs (121, 123), connected rigidly to respective ends of the stem (126), the position of at least one of these two plugs (121, 123) being preferably adjustable on the stem (126), each of the two selector plugs (121, 123) defining a relief valve seat (133, 134), two relief valves comprising two separate plugs (131, 132) slidably mounted on the stem between the selector plugs and a spring (128) interposed between the two relief valve plugs (131, 132).

8. The device according to claim 1 wherein the device comprises essentially a body (110) comprising three intakes (A, B and C) designed to be connected respectively to two feed lines and to one booster line, said cartridge body has a narrowed portion (117) defining two selector seats (122, 124), a selector valve (120) comprising a rigid stem (126) and two plugs (121, 123), slidably mounted on the stem (126), two adjustable stops (127) attached respectively to the ends of the stem (126) and two springs (128) interposed respectively between an adjustable stop (127) and an associated plug (121, 123) to bias each of the selector plugs against its associated seat, each of the two selector plugs (121, 123) defining a relief valve seat (133, 134), and means forming relief valves comprising a body in the shape of a dual-wheel interposed between the selector plugs and defining two plugs (131, 132) placed facing the relief valve seats, the body of the relief valve being slidably mounted on the stem between the selector plugs or free to slide on the stem between the selector plugs.

9. The device according to claim 1, wherein the two relief valve plugs (131, 132) are formed from separate bodies.

10. The device according to claim 1, wherein a selector valve and the relief valves are placed in a housing closed by a removable cap (112), the withdrawal whereof allowing adjustment of the setting of the spring (128).

11. The device according to claim 1 wherein a body receiving a selector valve and forming a relief valve includes a cartridge for placing in a block drilled with feed channels corresponding to intake ports (A, B, C) formed on the cartridge.

12. The device according to claim 1 wherein elements constituting the selector valve (72, 150) and the relief valves (71, 160) are placed in a block of a machined support body and provided with two closure caps (112a, 112b).

13. The device according to claim 1, wherein the selector plugs (121, 123) include radial passages (129) allowing the application of pressure to the relief valve plugs (131, 132).

14. The device according to claim 1, wherein the valve plugs (131, 132) are provided with damping means (136).

15. The device according to claim 14, wherein the damping means (136) comprise a calibrated oil leakage channel (230, 139).

16. The device according to claim 14, wherein the damping means (136) comprise a variable volume chamber delimited between two shoulders formed respectively on the stem (126) and on the body of the relief valves.

17. The device according to claim 1, wherein the stem (126) has at least two different diameters on different axial zones of its length to allow adjustment of different excess pressure thresholds.

18. The device according to claim 1, wherein the selector has a body that has the shape of a cage comprising a central element (220) which carries on its ends two excrescences forming a plug (221, 223).

19. The device according to claim 1, wherein the relief valve has the shape of a dual-wheel comprising a central element (130) which carries on its ends two excrescences forming a plug (131, 132).

20. The device according to claim 1, wherein each said valve plug and said common stem (126) are composed of different assembled parts.

21. The device according to claim 20, wherein the different parts are rigidly assembled.

22. The device according to claim 20, wherein the different parts are assembled with the possibility of relative movement.

23. The device according to claim 1, wherein a plug (711, 162) has at least two surfaces (S1, S2) situated on either side of the associated seat (155) and subjected respectively to the pressures coming from the two feed lines (11, 12).

24. The device according to claim 1, further comprising confinement means (227, 146) for applying pressure coming from a feed line to a limited localized zone of a plug (140).

25. The device according to claim 1, further comprising two translation guides for a plug (140), separated along the longitudinal direction of translation thereof, by a distance equal to at least one times the diameter of the plug resting on an associated seat (227), preferably by a distance equal to at least two times this diameter and very advantageously equal to at least five times this diameter.

26. The device according to claim 25, further comprising a first translation guide for a plug formed by the cooperation defined between the plug and its associated seat (227) and at least a second guide formed by an end of a plug stem guided on a body, for example a widened surface subjected to the pressure of a feed line or a support means for a biasing spring (128).

27. The device according to claim 1, wherein the two selector plugs (121, 123) are held away by a central body (130) which connects them.

28. The device according to claim 1, wherein the two valves comprise a common plug (14) which cooperates with a single seat (227).

29. The device according to claim 1, wherein the body which houses a selector valve and the relief valve comprises a narrowed portion (117) which defines two seats (122, 124).

30. A hydraulic assistance system comprising a relief device conforming to claim 29.

31. A vehicle equipped with a pressure relief device conforming to claim 30.

32. A pressure relief device suitable to be installed in a system including a first feed line (11) and a second feed line (12) and a discharge and/or booster line (10),
wherein the relief device comprises two valves (131, 132, 133, 134) associated respectively with one of the two feed lines (11, 12) and suitable for opening in the event of excess pressure above a predetermined threshold on the associated feed line so as to discharge the corresponding excess pressure toward the discharge and/or booster line (10) or toward the other feed line (11, 12),
the two valves comprising a common support stem (126) which operates in tension under the biasing of at least one spring (128) defining a setting which corresponds to said predetermined threshold,
wherein the two valves comprise a common plug (14) which cooperates with a single seat (227).

33. A pressure relief device for being installed in a system including a first feed line (11) and a second feed line (12) and a discharge and/or booster line (10),
wherein the relief device comprises two relief valves (131, 132, 133, 134) associated respectively with one of the two feed lines (11, 12) and suitable for opening in the event of excess pressure above a predetermined threshold on the associated feed line so as to discharge the corresponding excess pressure toward the discharge and/or booster line (10) or toward the other feed line (11, 12),
the two valves comprising a common support stem (126) which operates in tension under the biasing of at least one spring (128) defining a setting which corresponds to said predetermined threshold,
the pressure relief device comprising:
a selector valve, and
a body receiving the selector valve and forming the relief valves, the body consisting of a cartridge designed to be placed in a block drilled with feed channels corresponding to intake ports (A, B, C) formed on the cartridge.

* * * * *